(12) United States Patent
Mihara et al.

(10) Patent No.: US 8,836,974 B2
(45) Date of Patent: Sep. 16, 2014

(54) IMAGE PROCESSING SYSTEM AND CONTROL METHOD FOR MANAGING A JOB RELATED TO IMAGE PROCESSING IN A DISTRIBUTED ENVIRONMENT

(75) Inventors: Makoto Mihara, Yokohama (JP); Takeshi Takahashi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 406 days.

(21) Appl. No.: 13/030,839

(22) Filed: Feb. 18, 2011

(65) Prior Publication Data

US 2011/0205585 A1    Aug. 25, 2011

(30) Foreign Application Priority Data

Feb. 22, 2010   (JP) .................................. 2010-036554

(51) Int. Cl.
*G06F 3/12* (2006.01)
*G06K 15/00* (2006.01)

(52) U.S. Cl.
USPC .................. 358/1.15; 358/1.14; 358/1.16

(58) Field of Classification Search
CPC ..... G06F 3/1288; G06F 3/1203; G06F 3/126; G06F 3/1287; G06F 3/1238; G06F 3/124; G06F 3/1272; G06F 3/1273
USPC ....................... 358/1.14, 1.15, 1.16
See application file for complete search history.

(56) References Cited

U.S. PATENT DOCUMENTS

| | | | | |
|---|---|---|---|---|
| 7,167,262 | B2* | 1/2007 | Muramoto et al. | 358/1.15 |
| 2003/0234951 | A1* | 12/2003 | Lewis et al. | 358/1.14 |
| 2011/0007347 | A1* | 1/2011 | Kamath et al. | 358/1.15 |
| 2012/0057191 | A1* | 3/2012 | Gnanasambandam et al. | 358/1.15 |

FOREIGN PATENT DOCUMENTS

JP    2002-304271 A    10/2002

* cited by examiner

*Primary Examiner* — Fred Guillermety
(74) *Attorney, Agent, or Firm* — Canon USA, Inc., IP Division

(57) ABSTRACT

An image processing system including a service platform configured to manage a job related to image processing according to a processing request received via a request receiving program in a distributed environment and one or more computers configured to cause a back-end processing program to process the job, including an execution unit configured to execute a task defined in the job acquired by the acquisition unit under control of the back-end processing program, and a recording unit configured to record information which is a result of processing the task executed by the execution unit and is used to maintain consistency of the image processing system into an area which is protected against writing by the task and managed by the service platform.

8 Claims, 21 Drawing Sheets

FIG.6

Request:
PUT http://print-sv.queue.net:10001/dev_0001queue/messages ~601

Headers: ~602
x-ms-date:Mon,14 Sep 2009 17:00:25 GMT
Authorization:SharedKey dev_0001queue:sr8rlheJmCd6npMSx7DfAY3L//V3uWvSXOzUBCV9wnk=

Body:
<QueueMessage>
<MessageText>pk01||job01<MessageText> ~603
</QueueMessage>

FIG.7

| ETag | Partition Key | Row Key | Start Time | End Time | Status | Data ID | Last Task | LastTask Result | LastTask TryCount |
|---|---|---|---|---|---|---|---|---|---|
| abcdefg12 | pk01 | job01 | 2010/1/1 9:01:55 | 1900/1/1 00:00:00 | Processing | sfe-125 | 1 | None | 0 |
| faraighaio | pk02 | job02 | 1900/1/1 00:00:00 | 1900/1/1 00:00:00 | Ready | Ay4-314 | 0 | None | 0 |

701 702 703 704 705 706 707 708 709 710

| Max Task | Task1 ServiceID | Task1 Parameter | Task1 ServiceID | Task2 Parameter | ... | Task20 ServiceID | Task20 Parameter |
|---|---|---|---|---|---|---|---|
| 2 | service01 | \<Server>http://docserver/library\</Server>\<Path>folder/file.pdf\</Path> | service2 | \<Server>http://prinvserver/\</Server>\<device>device01\</device> | | | |
| 5 | serviceXX | | serviceYY | | | | |

| ETag | Partition Key | Row Key | URL | Type | Attribute |
|---|---|---|---|---|---|
| awe4jsm | service | service01 | http://xxx/conector/download | In | http://docserver/library |
| judjtgh | service | service02 | http://yyy/converter/pdf | Pipe | |
| gawegwe | service | service03 | Http://zzz/printservice/print | Out | http://printserver/ |

| | 901 | 902 | 903 | 904 | 905 | 906 | 907 | ... | 908 | 909 |
|---|---|---|---|---|---|---|---|---|---|---|
| | ETag | Partition Key | Row Key | MaxTask | Task1 | Task2 | Task3 | ... | Task19 | Task20 |
| | hjaoerke | sequence | seq01 | 3 | service01 | service02 | service03 | ... | | |
| | er4lseaa | sequence | seq02 | 2 | service01 | service03 | | ... | | |

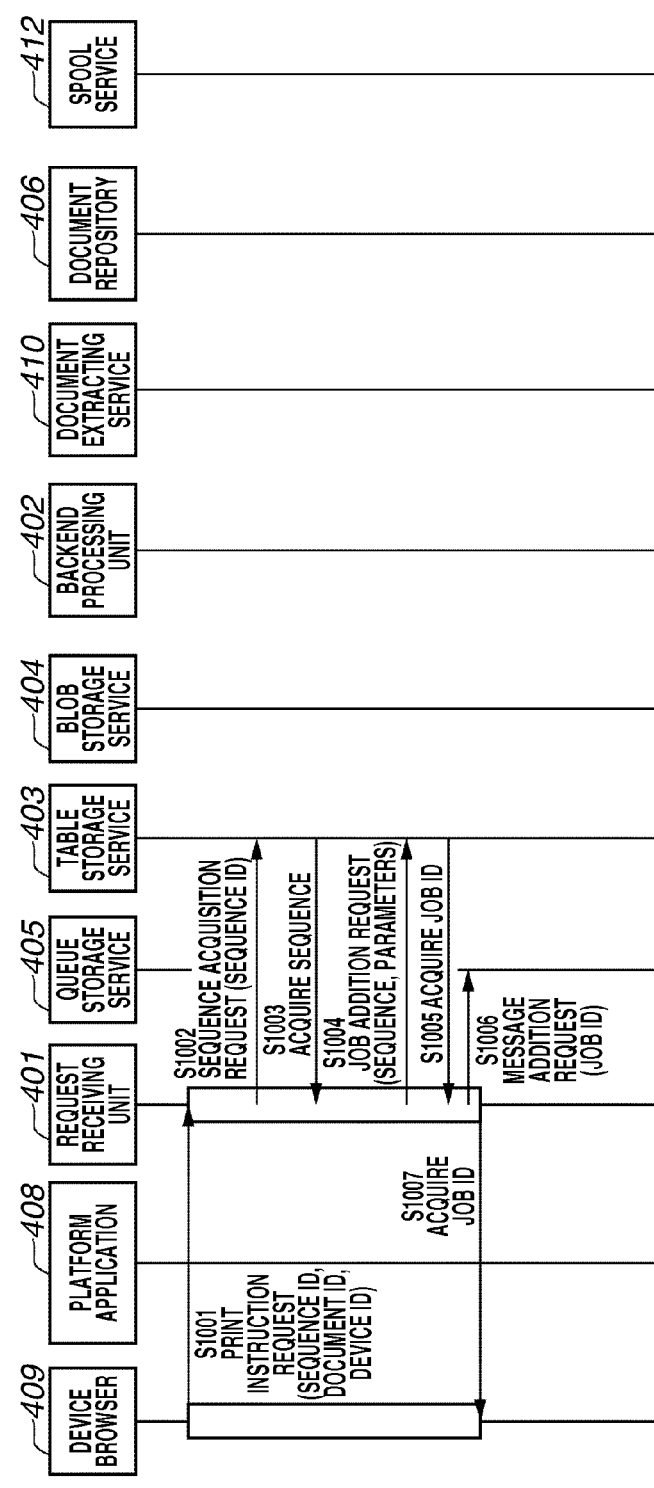

IMAGE PROCESSING SYSTEM AND CONTROL METHOD FOR MANAGING A JOB RELATED TO IMAGE PROCESSING IN A DISTRIBUTED ENVIRONMENT

BACKGROUND OF THE INVENTION

1. Field of the Invention

The present invention relates to an image processing system, an image processing system control method, and a storage medium.

2. Description of the Related Art

A content management system that uses the Internet communication method has been widespreadly used. In such a content management system, a user accesses a web page provided by a server computer from a client computer via the Internet. Further, the user selects a content to be viewed on the web page. The content management system transmits the selected content to the server computer. The server computer executes control to display the received content on a screen of the client computer operated by the user.

Japanese Patent Application Laid-Open No. 2002-304271 discusses a method for printing a content read by a user via a screen of a client computer using a printer. In this method, the server computer converts the content viewed by the user into data that can be printed by the printer. In addition, the server computer transmits the converted data to the printer. The printer prints the received data.

Meanwhile, in recent years, various methods, such as a cloud computing system or Software as a Service (SaaS) have been utilized, in which a server computer executes various processing.

In the cloud computing system, a large number of computing resources are utilized to distribute data conversion and data processing. Thus, a plurality of requests input from a plurality of different clients can be processed in parallel to one another.

Further, in a recent growing demand for an open system, a system, which has been developed as a platform and executes or cooperatively operates service applications thereon, has been used.

SUMMARY OF THE INVENTION

According to an aspect of the present invention, an image processing system including a service platform configured to manage a job related to image processing according to a processing request received via a request receiving program in a distributed environment and one or more computers configured to cause a back-end processing program to process the job includes a receiving unit configured to receive a plurality of processing requests related to image processing under control of the request receiving program, a registration unit configured to register the processing request received by the receiving unit as a job, an acquisition unit configured to acquire the job registered by the registration unit without waiting for a request from a user or a program under control of the back-end processing program, an execution unit configured to execute a task defined in the job acquired by the acquisition unit under control of the back-end processing program, and a recording unit configured to record information which is a result of processing the task executed by the execution unit and is used to maintain consistency of the image processing system into an area which is protected against writing by the task and managed by the service platform.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the present invention.

FIG. 6 illustrates an example of a queue message according to an exemplary embodiment of the present invention.

FIG. 7 illustrates an example of a job management table according to an exemplary embodiment of the present invention.

FIG. 8 illustrates an example of a service table according to an exemplary embodiment of the present invention.

FIG. 9 illustrates an example of a service sequence table according to an exemplary embodiment of the present invention.

FIGS. 10A to 10C illustrate an exemplary sequence of processing according to an exemplary embodiment of the present invention.

DESCRIPTION OF THE EMBODIMENTS

Figure 1:
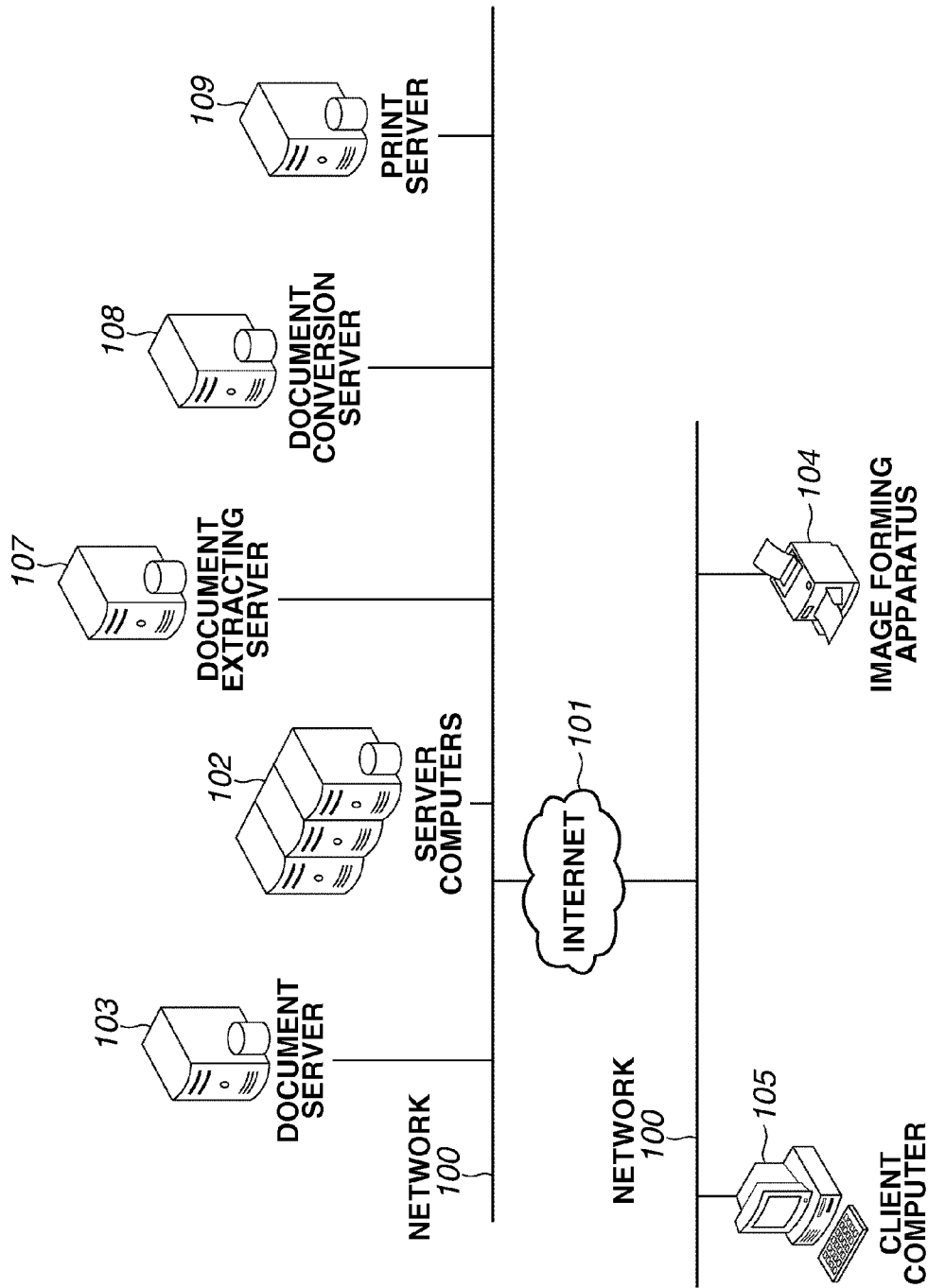
FIG. 1 illustrates an exemplary configuration of a network printing system according to an exemplary embodiment of the present invention.

Various exemplary embodiments, features, and aspects of the invention will be described in detail below with reference to the drawings.

As described in the consistency, availability and partition tolerance (CAP) theorem, the cloud system essentially sacrifices the consistency as a platform to some extent in order to achieve high availability and partition tolerance. For example, in order to increase the availability, the cloud system employs a method for automatically retrying back-end processing executed by a cloud platform if the back-end processing does not end within predetermined time. In other words, the cloud system employs the method designed for re-starting the processing even if unexpected processing is executed by the back-end or if the processing is suspended due to abnormal termination of the system.

However, it may be difficult for a user or a program to determine the status as to whether the back-end processing has run away, whether processing has been executed past the time limit, or whether the processing has been terminated due to abnormal termination of the system. Further, the same job may be adversely executed by a multiple of number of times. In this case, the consistency is sacrificed.

In addition, data stored in a database of the cloud platform cannot be updated using transaction in order to increase the scalability (partition tolerance). As a result, if the updating of information indicating a processing result is executed at a wrong timing, data may not surely be updated. Accordingly, the information indicating the processing result may become inconsistent.

As described above, in the cloud platform, the consistency, the availability, and the partition tolerance have a "tradeoff" relationship. However, a predetermined level of consistency may be necessary in terms of the practicability of an application and a service utilized by a user.

One aspect of the following embodiments may solve at least one of the above-described problems. Furthermore, in one aspect of the embodiments, distributed processing that utilizes the characteristics of the cloud system can be implemented. In addition, in another aspect of the embodiments, a method for implementing an application and a service having a sufficiently high level of consistency can be implemented.

At first, terms used in each exemplary embodiment of the present invention have the following definitions. "Print data processing" indicates processing for converting a content that a user wants to print into data that an image forming apparatus, such as a multifunction peripheral (MFP) or a printer, can print out. A "content" indicates electronic data including a combination of document data, such as a text, and image data, such as a raster image including raster (bitmap (BMP)) images. "Print data" indicates data generated by converting the content by print data processing. The print data may include page description language (PDL) data, portable document format (PDF) data, and a raster image.

Apparatus included in a network printing system 1000 according to an exemplary embodiment of the present invention will be described in detail below with reference to FIG. 1. Referring to FIG. 1, apparatuses included in the network printing system 1000 are in communication with one another via a network 100. The apparatuses in the network printing system 1000 includes a server computers 102, a document server 103, an image forming apparatus 104, a client computer 105, a document extracting server 107, a document conversion server 108, and a print server 109.

The network 100 is a communication line for data communication among the above-described apparatuses. The Internet 101 is a communication line for data communication among the above-described apparatuses over a firewall. Via the Internet 101, the communication with the network 100 including the server computers 102 can be executed from the network 100 including the image forming apparatus 104 and the client computer 105 over the firewall.

The network 100 and the Internet 101 are communication networks that supports transmission control protocol (TCP)/Internet protocol (IP). The communication via the network 100 and the Internet 101 can be either wired or wireless. In the exemplary embodiment of the present invention illustrated in FIG. 1, although the server computers 102 is illustrated as one server, it is supposed that the server computers 102 includes a plurality of server computers.

Figure 2:
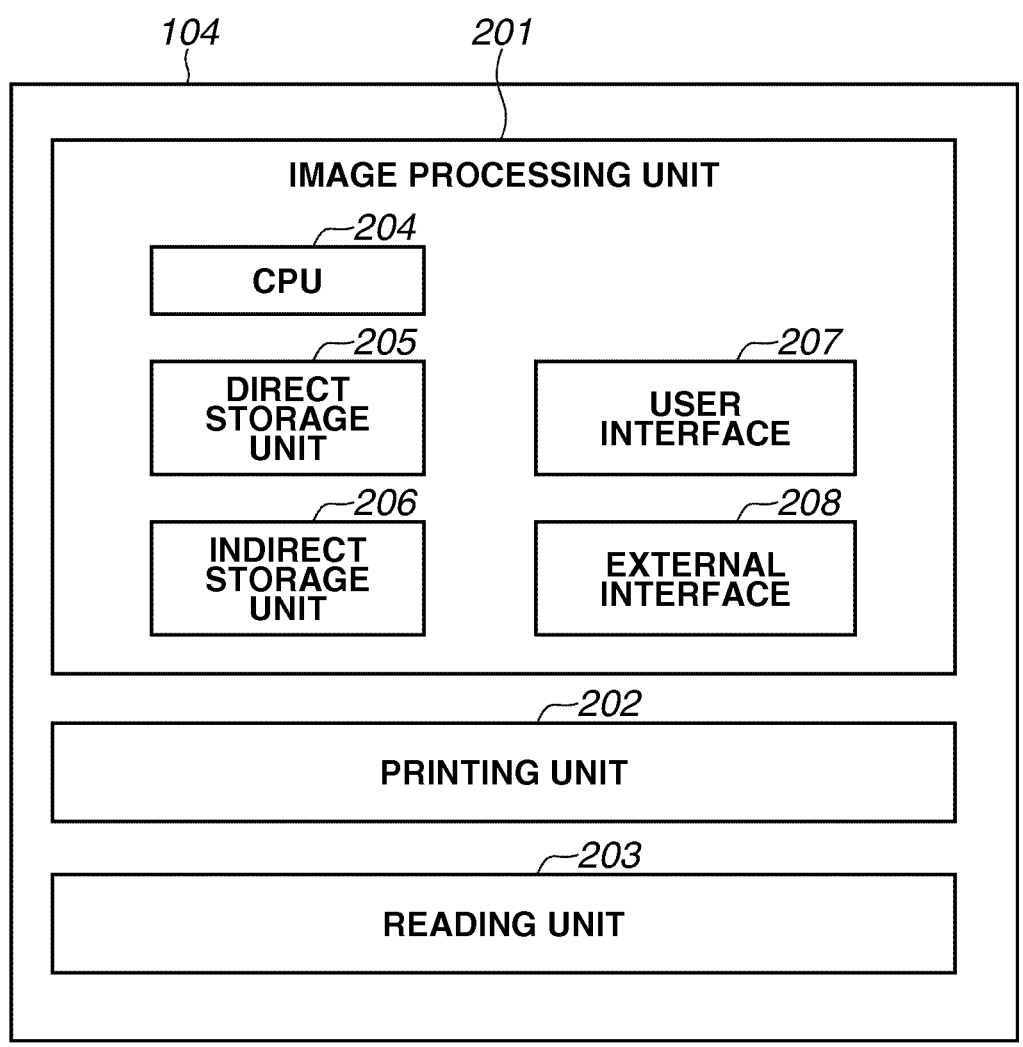
FIG. 2 illustrates a detailed exemplary inner configuration of an image forming apparatus according to an exemplary embodiment of the present invention.

Now, an exemplary inner configuration of each apparatus included in the network printing system 1000 illustrated in FIG. 1 will be described in detail below. At first, an exemplary inner configuration of the image forming apparatus 104 will be described in detail below with reference to FIG. 2. FIG. 2 is a block diagram illustrating the exemplary inner configuration of the image forming apparatus 104.

The image forming apparatus 104 includes an image processing unit 201, a printing unit 202, and a reading unit 203. The image processing unit 201 includes a central processing unit (CPU) 204, a direct storage unit 205, an indirect storage unit 206, a user interface 207, and an external interface 208.

The CPU 204 is a unit that executes a predetermined program and instructs various controls on the image forming apparatus 104. The direct storage unit 205 is a work memory used by the CPU 204 in executing the program. The program executed by the CPU 204 is loaded on the direct storage unit 205. The direct storage unit 205 is implemented by a random access memory (RAM).

The indirect storage unit 206 stores various programs, such as an application program, and a platform program. Various programs stored in the indirect storage unit 206 are moved by the CPU 204 to the direct storage unit 205 when the CPU 204 executes the program. The indirect storage unit 206 is implemented by a solid state drive (SSD) or a hard disk drive (HDD). A multiprocessor can also be used as the CPU 204.

Now, a platform which is implemented by executing a platform program will be described in detail below. Implementation of the platform enables a user to execute a new application originally developed by the user on the image forming apparatus 104 and to customize an operation screen of the image forming apparatus 104.

An exemplary method for implementing the platform will be described in detail below. The CPU 204 moves a platform program stored in the indirect storage unit 206 to the direct storage unit 205. When the platform program is completely moved to the direct storage unit 205, the CPU 204 can execute the platform program. In the exemplary embodiment of the present invention, it is described that a platform is "activated" when the platform program is executed by the CPU 204. The platform operates on firmware of the image forming apparatus 104. Further, the platform program provides an environment for executing an application program described using an object-oriented language.

A method for executing the application program on the platform will be described in detail below. In the exemplary embodiment of the present invention, printing software that receives a print request operates on the platform. The printing software can receive print data from a device connected via the network using a communication protocol, such as hypertext transport protocol (HTTP).

The printing software transmits the received print data to the firmware. After receiving the print data, the firmware starts print data processing. If the print data has a format that can be printed without executing the print data processing, the firmware omits the print data processing. As described above, control of the image forming apparatus 104 can be implemented by executing the application program on the platform.

An exemplary method for executing the application program will be described in detail below. After being activated, the platform moves the application program stored in the indirect storage unit 206 to the direct storage unit 205. After moving the application program, the platform can execute the application program. Then, the platform executes the application program.

In the exemplary embodiment of the present invention, the above-described function of the platform which can provide a service by executing the application program on the platform is referred to as a "platform application". Further, the platform can execute a part of each processing illustrated in each flow chart discussed in the exemplary embodiment of the present invention.

The user interface 207 is a unit necessary for receiving a processing request input by the user. More specifically, the user interface 207 receives a signal corresponding to an instruction input by the user via a keyboard or a mouse. The external interface 208 can transmit and receive data to and from an external apparatus. More specifically, the external apparatus can include an external storage device, such as an external hard disk drive (HDD) or an external universal serial bus (USB) memory, or a separate host computer or a separate image forming apparatus which is connected via the network. The image forming apparatus 104 can communicate with the client computer 105 and the server computers 102 via the network 100 and the Internet 101.

The printing unit 202 has a function for printing print data that has been subjected to the print data processing on a recording medium. The reading unit 203 has a function for reading a document set on a document stand and for generating a document image. In the exemplary embodiment of the present invention, the reading unit 203 is a scanner.

Figure 3:
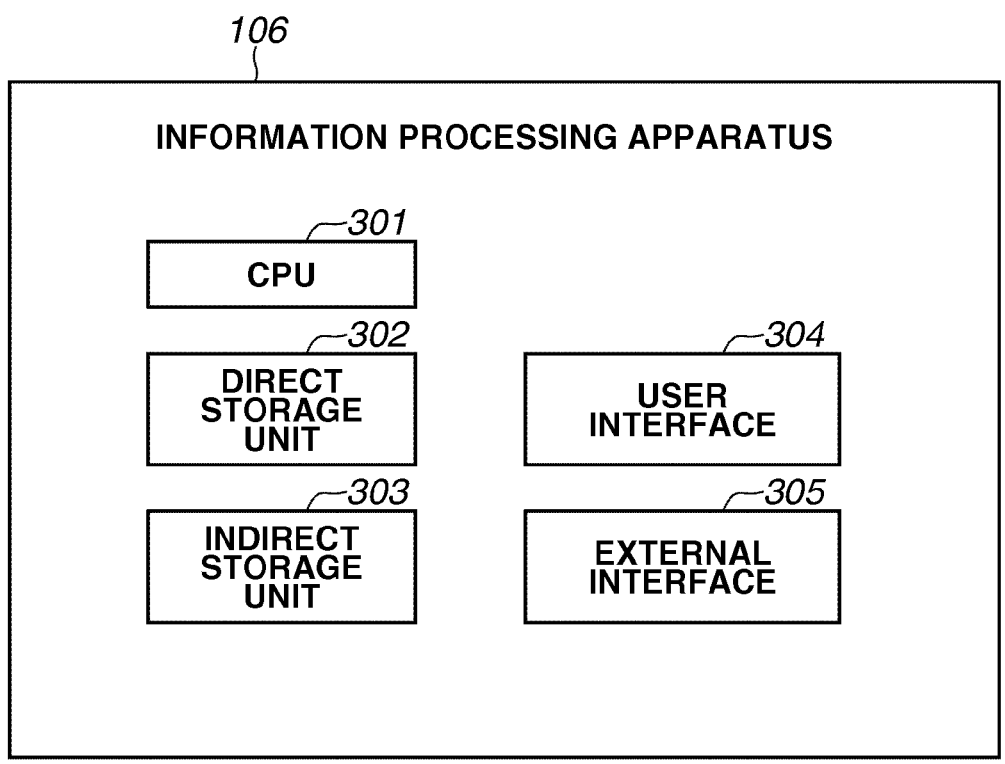
FIG. 3 illustrates a detailed exemplary inner configuration of an information processing apparatus according to an exemplary embodiment of the present invention.

Secondly, an exemplary inner configuration of an information processing apparatus 106 which includes the server computers 102, the document server 103, the client computer 105, the document extracting server 107, the document conversion server 108, and the print server 109 will be described in detail below with reference to FIG. 3. FIG. 3 is a block diagram illustrating an exemplary inner configuration of the information processing apparatus 106.

The information processing apparatus 106 includes a CPU 301, a direct storage unit 302, an indirect storage unit 303, a user interface 304, and an external interface 305. The user interface 304 is a unit necessary for receiving a processing request input by the user. More specifically, the user interface 207 receives a signal corresponding to an instruction input by the user via a keyboard or a mouse.

The CPU 301 is a unit that executes a predetermined program and instructs various controls on the information processing apparatus 106. The direct storage unit 302 is a work memory used by the CPU 301 in executing the program. The program executed by the CPU 301 is loaded on the direct storage unit 302. The direct storage unit 302 is implemented by a RAM.

The indirect storage unit 303 stores various programs, such as an application program, and an operating system (OS). Various programs stored in the indirect storage unit 303 are moved to the direct storage unit 302 when the CPU 301 executes the program. The indirect storage unit 303 includes a read-only memory (ROM) or an HDD. The external interface 305 is connected to the network 100. Accordingly, the information processing apparatus 106 can communicate with other apparatuses on the network 100.

Figure 4:
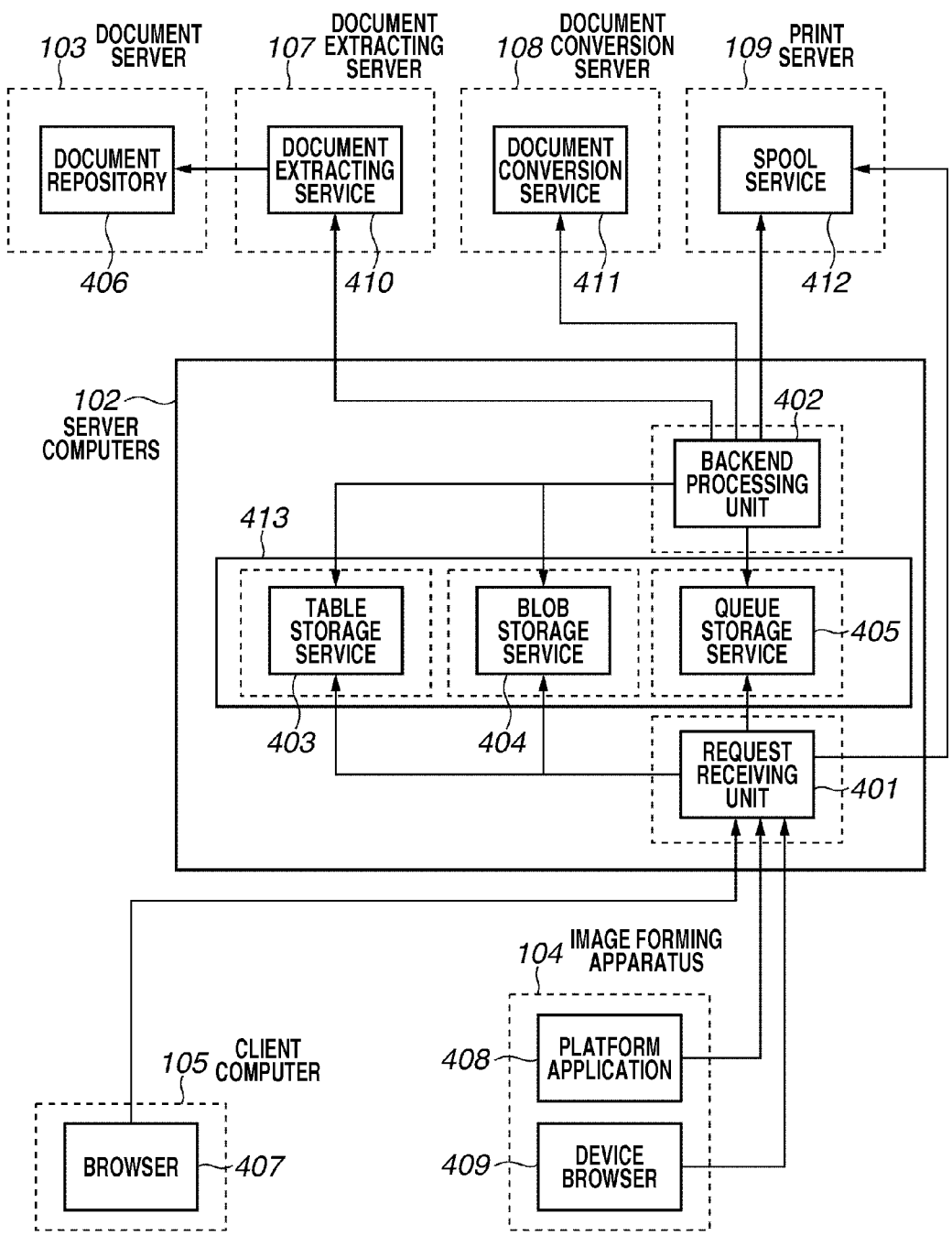
FIG. 4 illustrates an example of a function of each apparatus according to an exemplary embodiment of the present invention.

Now, functions of the apparatuses included in the printing system 1000 according to the exemplary embodiment of the present invention will be described in detail below with reference to FIG. 4. FIG. 4 is a block diagram illustrating an example of a function of each apparatus included in the printing system 1000.

To begin with, a function of the server computers 102 will be described in detail. The server computers 102 includes various functions, such as a request receiving unit 401, a back-end processing unit 402, a table storage service 403, a blob storage service 404, and a queue storage service 405. In the exemplary embodiment of the present invention, at least one server computer having the request receiving unit 401 exists. Further, at least one server computer having the back-end processing unit 402 exists. Furthermore, at least one server computer having each function of the table storage service 403, the blob storage service 404, and the queue storage service 405 exists. The above-described function can be provided to different server computers.

A job management service platform 413 is an example of a service platform. The job management service platform 413 includes the table storage service 403, the blob storage service 404, and the queue storage service 405. The job management service platform 413 can also include the back-end processing unit 402 and the request receiving unit 401 in addition to the above-described components. The request receiving unit 401 provides a function for receiving a processing request transmitted from the client computer 105 or the image forming apparatus 104.

The back-end processing unit 402 has a function for processing a processing request using a processing program. In the exemplary embodiment of the present invention, the "processing request" refers to a processing request received by the request receiving unit 401. The back-end processing unit 402 loads the processing program on the direct storage unit 302 of the server computer that currently executes the back-end processing unit 402 and executes the processing program.

The request receiving unit 401 and the back-end processing unit 402 are implemented by the CPU 301 by loading and executing a request receiving program or a back-end processing program stored in the indirect storage unit 303 illustrated in FIG. 3 on the direct storage unit 302. The request receiving unit 401 and the back-end processing unit 402 will be described in detail below.

The table storage service 403 provides a function for storing various pieces of status information, such as a status of progress of the processing executed by the back-end processing unit 402. The table storage service 403 is implemented by the CPU 301 by loading and executing a table storage service program stored in the indirect storage unit 303 illustrated in FIG. 3 on the direct storage unit 302. In addition, data is stored in the indirect storage unit 303. The table storage service 403 will be described in detail below.

The blob storage service 404 provides a function for storing various data pieces, such as execution result data of processing by the back-end processing unit 402. The blob storage service 404 is implemented by the CPU 301 by loading and executing a blob storage service program stored in the indirect storage unit 303 illustrated in FIG. 3 on the direct storage unit 302. Data is stored in the indirect storage unit 303. The blob storage service 404 will be described in detail below.

The queue storage service 405 provides the following two functions. Firstly, the queue storage service 405 has a function for establishing an asynchronous data communication between the request receiving unit 401 and the back-end processing unit 402. Secondly, the queue storage service 405 has a function for causing a queue message that has been added to a queue to become invisible or visible. A "queue" refers to a storage function implemented by the queue storage service 405. Further, a queue is implemented by a list structure "first-in first-out (FIFO)".

The first function will be described in detail below. The request receiving unit 401 and the back-end processing unit 402 communicates with each other by the following method. At first, when receiving a processing request input by the user, the request receiving unit 401 generates a ticket "queue message" which corresponds to the processing request from the user. A queue message 600 is stored in the queue by the request receiving unit 401. After acquiring the queue message 600 from the queue, the back-end processing unit 402 refers to the queue message 600 and processes the processing request from the user. In the above-described manner, the back-end processing unit 402 provides a solution to the processing request from the user.

By utilizing the queue service 405, the request receiving unit 401 and the back-end processing unit 402 can communicate with each other asynchronously. The first and the second functions will be described in more detail below. The queue storage service 405 is implemented by the CPU 301 by loading and executing a queue storage service program stored in the indirect storage unit 303 illustrated in FIG. 3 on the direct storage unit 302. Data is stored in the indirect storage unit 303.

The server computers 102 have the above-described functions. The functions of the server computers 102 will be described in more detail below.

An exemplary function of the document server 103 will be described in detail below. The document server 103 has a function of the document repository 406. The document repository 406 is implemented by the indirect storage unit 303 illustrated in FIG. 3. More specifically, the document repository 406 stores a content instructed by the user to be printed from the client computer 105 or the image forming apparatus 104. The content stored in the document repository 406 includes the following content as well as a previously stored content.

In other words, the document repository 406 stores a content generated by the user by using the application operating on the server computers 102 via a browser 407 or a device browser 409, which will be described in detail below. Accordingly, if a content is generated by using the application on the server computers 102, the content can be easily printed without installing an application on the client computer 105.

The application on the above described server computers 102 refers to various applications, such as a document generation application, an image generation application, and a form management application. These applications are stored in the indirect storage unit 303 illustrated in FIG. 3. When an instruction to execute the application is input, the application is loaded and executed by the CPU 301 on the direct storage unit 302.

The image forming apparatus 104 will be described in detail below. The image forming apparatus 104 includes a function of the device browser 409 and the platform application 408. The device browser 409 has a function for allowing the user to view data and information stored within the device connected via the network 100. The device browser 409 is implemented by the CPU 204 by loading and executing a device browser program stored in the indirect storage unit 206 illustrated in FIG. 2 on the direct storage unit 205. The user can input an instruction to print the content via the device browser 409. The input print instruction is transmitted to the request receiving unit 401 of the server computers 102. The device browser 409 may be a web browser, for example.

The platform application 408 provides a function for providing various services. The platform application 408 is implemented by an application program operating on the platform. In the exemplary embodiment of the present invention, the platform application 408 provides a printing software service. As described above, the service can transmit the received print data to the firmware. In addition, the service checks whether the request receiving unit 401 has completed processing for generating print data. More specifically, the service checks the generation of the print data based on a job identification (ID) generated by the request receiving unit 401.

Now, the client computer 105 will be described in detail below. The client computer 105 provides a function of the browser 407. The browser 407 provides a function for allowing the user to view the data and information stored within the device connected via the network 100. The browser 407 is implemented by the CPU 301 by loading and executing a browser program stored in the indirect storage unit 303 illustrated in FIG. 3 on the direct storage unit 302. The browser 407 may be a web browser, for example.

The document extracting server 107 will be described in detail below. The document extracting server 107 provides a function of a document extracting service 410. The document extracting service 410 is implemented by the CPU 301 by loading and executing a document extracting program stored in the indirect storage unit 303 illustrated in FIG. 3 on the direct storage unit 302. The document extracting service 410 provides a function for accessing the document server 103 according to a document extracting instruction received via the external interface 305 and for acquiring the content stored in the document repository 406.

The document conversion server 108 will be described in detail below. The document conversion server 108 has a function of a document conversion service 411. The document conversion service 411 is implemented by the CPU 301 by loading and executing a document conversion program stored in the indirect storage unit 303 illustrated in FIG. 3 on the direct storage unit 302. The document conversion service 411 includes a function for converting instructed data (content) into a predetermined data format according to a document conversion instruction received via the external interface 305. More specifically, in the exemplary embodiment of the present invention, the document conversion service 411 includes a function for converting the content into portable document format (PDF) data.

Lastly for the description about the components of the information processing apparatus 106, the print server 109 will be described in detail below. The print server 109 has a function of a spool service 412. The spool service 412 is implemented by the CPU 301 by loading and executing a spool program stored in the indirect storage unit 303 illustrated in FIG. 3 on the direct storage unit 302. The spool service 412 has a function for generating and assigning an attribute necessary for printing the instructed data (i.e., a print priority and tint information) according to an instruction received via 305.

The apparatuses included in the network printing system 1000 according to the exemplary embodiment of the present invention have the above-described functions.

Figure 5:
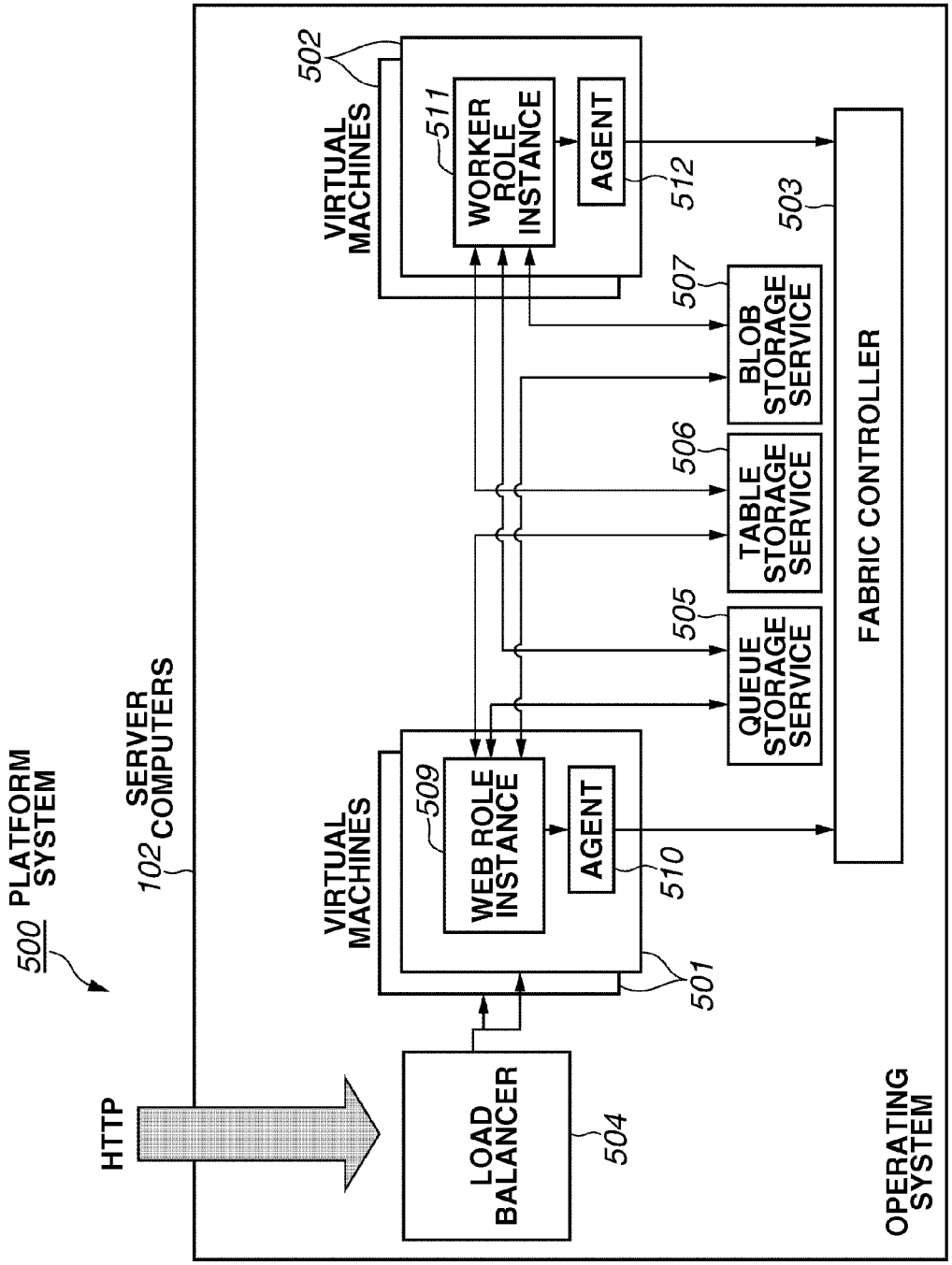
FIG. 5 illustrates an exemplary configuration of a platform system according to an exemplary embodiment of the present invention.

Next, a platform system of the server computers 102 will be described in detail below with reference to FIG. 5. FIG. 5 illustrates various functions included in a platform system 500. Referring to FIG. 5, physical hardware resources existing within the server computers 102 are used to implement the platform system 500. A person who utilizes the platform system 500 of the server computers 102 can use the physical hardware resources included in the server computers 102 as computing resources.

The platform system (operating system (OS)) 500 of the server computers 102 provides the following functions, that is, virtual machines 501 and 502, a fabric controller 503, a load balancer 504, a queue storage service ("Queue") 505, a table storage service ("Table") 506, and a blob storage service ("Blob") 507.

The platform system 500 which is implemented on the server computers 102 includes a plurality of virtual machines 501 and 502. A "virtual machine" refers to a logical computer which divides the physical server computers 102 into logical computers by a virtualization method and which operates using an independent OS among the divided logical computers. The logical computers are counted in the unit of an "instance". In the exemplary embodiment of the present invention, one server computer included in the server computers 102 is assigned to one instance (i.e., one virtual machine).

The virtual machine 501 includes a request receiving unit ("web role instance") 509, and a request receiving unit agent ("Agent") 510. The request receiving unit 509 receives a processing request from the user via the load balancer 504, which will be described in detail below. In addition, the request receiving unit 509 transmits the processing request to the virtual machine 502 via the queue storage service 505. In order to secure a high availability of the request receiving unit 509, a request from an external network (in the exemplary embodiment of the present invention, the communication by HTTP) is executed via the load balancer 504 which is provided external to the virtual machine 501.

The lord balancer 504 centrally manages requests input by the external network. In addition, the load balancer 504 selectively transfers the request to the plurality of virtual machines which have a request receiving function similar to the request receiving unit 509.

The request receiving unit agent 510 collects various information pieces including a status of use of the virtual machine 501, an operation status of the request receiving unit 509, a status of use of a resource of the virtual machine 501, and an error that has occurred on the request receiving unit 509. Further, the request receiving unit agent 510 periodically transmits the collected information to the fabric controller 503. The virtual machine 501 is equivalent to the request receiving unit 401 illustrated in FIG. 4.

Each instance of the request receiving unit 509 and a back-end processing unit 511 is managed by the fabric controller 503. Accordingly, the scalability and the availability of each instance are assured. More specifically, suppose that a specific instance of the request receiving unit 509 or the back-end processing unit 511 has been suspended due to a failure on the server. In this case, the fabric controller 503 cannot receive a periodical notification from the request receiving unit agent 510 or a back-end processing unit agent 512. If the fabric controller 503 does not receive a periodic notification, the fabric controller 503 instructs the virtual machine to delegate a new instance to execute the processing. In other words, the new virtual machine can function as a substitute to the virtual machine that cannot be activated due to a failure or an incident equivalent to the failure. As a result, the number of instances currently executing the processing can be kept constant. Accordingly, delay in the processing can be suppressed.

The virtual machine 502 includes the back-end processing unit ("Worker Role Instance") 511 and the back-end processing unit agent ("Agent") 512. The back-end processing unit 511 receives a processing request input by the request receiving unit 509 via the queue storage service 505. The back-end processing unit 511 executes the processing request received from the request receiving unit 509 via the queue storage service 505. In addition, the back-end processing unit 511 executes scale out.

The "scale out" refers to an increase of the number of instances of the back-end processing unit 511 that occurs due to the increase of the number of virtual machines 502. When the instances of the back-end processing unit 511 increases, the amount of data processing assigned to one back-end processing unit decreases. Accordingly, in this case, a result of executing the processing request input by the user can be very quickly returned. The request receiving unit 509 receives a scale-out instruction. The virtual machines 502 is equivalent to the back-end processing unit 402 illustrated in FIG. 4.

The queue service 505 provides a service for implementing asynchronous data communication between the request receiving unit 509 and the back-end processing unit 511. The request receiving unit 509 and the back-end processing unit 511 executes asynchronous data communication by inputting various instructions to the queue storage service 505. The asynchronous data communication between the request receiving unit 509 and the back-end processing unit 511 will be described in detail below. The instruction that the request receiving unit 509 inputs to the queue storage service 505 includes a queue message addition instruction. The instruction that the back-end processing unit 511 inputs to the queue storage service 505 includes a queue message acquisition instruction and a queue message deletion instruction.

A series of asynchronous data communication operations executed between the request receiving unit 509 and the back-end processing unit 511 will be described in detail below. The request receiving unit 509 generates a queue message 600 according to a processing request input by the user. In addition, the request receiving unit 509 transmits the queue message addition instruction to the queue storage service 505 to add the queue message 600 to the queue. After receiving the queue message addition instruction, the queue storage service 505 adds the queue message 600 to the queue.

In order to acquire the queue message 600, the back-end processing unit 511 inputs the queue message acquisition instruction to the queue storage service 505. After receiving the queue message acquisition instruction, the queue storage service 505 returns the queue message 600 and a message ID and a job ID which are uniquely assigned to each queue message 600 to the back-end processing unit 511 in response to the queue message acquisition instruction.

More specifically, the "message ID" refers to unique information assigned to each queue message 600 in order to uniquely define the queue message 600. The message ID is used by the back-end processing unit 511, whose processing has been completed, in inputting an instruction for deleting the queue message 600. The job ID is an ID for uniquely defining the content of the actual processing.

After completing the processing request, the back-end processing unit 511 inputs the queue message deletion instruction corresponding to the message ID to the queue storage service 505. After receiving the queue message deletion instruction, the queue storage service 505 deletes the queue message corresponding to the message ID instructed by the back-end processing unit 511. Accordingly, redundant processing for processing the same queue message, which may be adversely executed by the back-end processing units 511 different from the back-end processing unit 511 that has output the queue message deletion instruction, can be effectively prevented.

Further, the queue storage service 505 has a function for causing the queue message 600 that has been added to the queue to become visible or invisible. More specifically, if the queue message 600 is caused to be "invisible", the queue storage service 505 does not transfer the queue message 600 to the back-end processing unit 511 even if the back-end processing unit 511 has input a request for acquiring the queue message 600 that has been added to the queue.

After acquiring the queue message 600 from the queue, the acquired queue message is caused to become invisible by the queue storage service 505. If the queue message is to become "visible", the queue storage service 505 transfers the queue message to the back-end processing unit 511 if the back-end processing unit 511 has input a request for acquiring the queue message 600 that has been added to the queue.

The invisible queue message that has been acquired by the back-end processing unit 511 may be caused by the queue storage service 405 to become visible if a processing result is not returned within predetermined time from the back-end processing unit 511 that currently executes the processing. The term "visible" refers to the same state as described above. Accordingly, if the back-end processing unit 511 has been abnormally terminated and cannot continue the processing, the processing is to be automatically retried.

The table storage service 506 provides a storage utilized in storing data. The table storage service 506 stores the data in a simple format including a combination of an entity and a property of type information.

The blob storage service 507 provides a storage utilized in storing data. More specifically, the blob storage service 507 provides a function for storing an aggregate of binary data.

In addition, the queue message 600 according to the exemplary embodiment of the present invention will be described in detail below. FIG. 6 illustrates an example of the queue message 600. The queue message 600 describes a content of the processing that the request receiving unit 509 requests the back-end processing unit 511.

A request 601 indicates a location of the queue storage service 505 to which the queue message 600 is added. The request receiving unit 509 analyzes a message illustrated in FIG. 6 and identifies the location of the queue storage service 505. Further, the request receiving unit 509 inputs information included in a header 602 and thereafter of the message illustrated in FIG. 6. The header 602 stores authentication information for accessing the queue storage service 505. The authentication information includes a hash value of a character string necessary for utilizing the queue storage service 505. The queue storage service 505 reads the header information and compares the read header information with a character string previously stored within the queue storage service 505 to execute the authentication. Further, the queue storage service 505 determines whether the queue message 600 including the header 602 can be accepted.

Now, a message data content portion of the queue message 600 will be described in detail below. The message data content portion is determined according to the processing request input by the user. A portion <MessageText> 603 indicates the job ID. In the example illustrated in FIG. 6, the job ID "pk01|job01" is included in the portion <MessageText> portion 603. The job ID is unique information generated according to the processing request input by the user. In other words, the job ID included in the portion 603 is equivalent to the above-described job ID. The content portion is stored in the queue storage service 505. As described above, the message stored in the queue storage service 505 is processed by the back-end processing unit 511 for each job.

A job table according to the exemplary embodiment of the present invention will be described in detail below. The job table manages a series of processing executed by the back-end processing unit 402 as a job and stores the content of the job and the status of progress of the processing of the job. The job table is stored in the table storage service 506.

FIG. 7 illustrates an actually stored job table 700. Referring to FIG. 7, an ETag 701 is a value automatically set by the table storage service 506. If the string data is updated, a unique value is written in the ETag 701. In updating the data acquired from the table, if the value of the ETag 701 at the time of acquisition of the data and the value of the ETag 701 at the time of updating the data differ from each other, it can be identified that the table has been updated by another processing.

A partition key 702 and a row key 703 indicate an ID for uniquely identifying each row of the table. In the job table 700, values of these two keys 702 and 703 identify a job. In other words, these two values are equivalent to the job ID.

To a start time field 704, date and time of start of processing a job processed by the back-end processing unit 402 is registered. To an end time field 705, date and time of end of processing the job is registered. Before or after a job is started, initial values are set to the start time field 704 and the end time field 705.

A status field 706 stores a status of the entire job. The status of the job is managed by statuses, "Ready" (preparation completed), "Processing" (processing currently executed), "Success" (job successfully processed), and "Failure" (processing of the job failed). The completed preparation status ("Ready") indicates the status after the request receiving unit 401 has added a job to the job table and before the back-end processing unit 402 starts processing the job. The currently executed processing status ("Processing") corresponds to the status after the back-end processing unit 402 has started the processing of the job and before all the tasks defined by the job or to the status before the processing fails halfway through the job. The successfully processed job status ("Success") indicates the status in which the back-end processing unit 402 has processed all the tasks defined in the job and in which the processing of all the tasks has been successfully executed. The failed job processing status ("failure") indicates the status in which the task has not been successfully processed as a result of executing the task by the back-end processing unit 402 or the status in which it is determined that the quality of the service does not satisfy a predetermined standard before executing the task.

As described above, one job includes one or more tasks. When all of the one or more tasks included in the job are completely processed, the processing of one job is completed. More specifically, in registering the print data to the print server 109, if the print server 109 cannot complete the processing due to a temporary high processing load or if the communication for transferring the data is temporarily discontinued, it is highly likely that the uncompleted or the temporarily discontinued processing may be successfully completed if the processing is executed again. In this case, a value "FailureRetry" is returned for the processing. On the other hand, if the suspended or discontinued processing is not likely to be successfully completed even if the processing is executed again, i.e., if the format of print data to be registered is not supported by the print server 109 or if the image forming apparatus 104 which prints the print data is not recognized by the print server 109, then a value "Failure" is returned for the processing.

A data ID field 707 stores an ID assigned to the data associated with the job. The data is stored in the blob storage service 507 and is a unique value within the blob storage service 507.

A last task field 708 records the task number of a task that has been completed. A job includes a plurality of tasks that is to be serially processed. Now, the "task" will be described in detail below. Suppose that a job including two tasks exists and that the name of the job is "job A". The job A includes a combination of a first task for acquiring a file from the document server 103 and a second task for inputting data to the print server 109. In the present invention, the first task is defined as "task 1" and the second task is defined as "task 3". The job A is processed by serially executing these two tasks.

If the processing has progressed up to the completion of the task for acquiring a file from the document server 103, a value "1" is recorded to a last task field 708. If no task has been completely executed yet, a value "0" is recorded to the last task field 708. On the other hand, if the processing has progressed up to the completion of the task for inputting data to the print server 109, a value "3" is recorded to the last task field 708.

Although not illustrated in the drawing, in the exemplary embodiment of the present invention, the following task may exist. More specifically, a task for inputting a file (content) acquired by the first task to the document conversion server 108 and for causing the document conversion server 108 to convert the input content. The above-described type of task is defined as a "task 2". When the task 2 is completely executed, a value "2" is recorded to the last task field 708.

A last task result field 709 stores a result of the processing of a task executed last. The task processing result is managed by using various parameters, such as "None" (indicating the status before the processing of the task is completed), "Success" (successfully completed task), "FailureRetry" (failed task that can be completed by retrying the same), and "Failure" (failed task). It is necessary to return a processing result by using either one of the above-described parameters for each task. If the processing of the task has been successfully completed, the parameter "Success" is returned.

For example, in registering print data to the print server 109, if the print server 109 cannot complete the processing due to a temporary high processing load or if the communication for transferring the data is temporarily discontinued, the task returns the following value. More specifically, the task returns a value "FailureRetry" for the uncompleted or the temporarily discontinued processing that is highly likely to be successfully completed if the processing is executed again. On the other hand, if the suspended or discontinued processing is not likely to be successfully completed even if the processing is executed again, i.e., if the format of print data to be registered is not supported by the print server 109 or if the image forming apparatus 104, which prints the print data, is not recognized by the print server 109, then a value "Failure" is returned for the processing.

A Last Task Try Count field 710 records how many times the last-executed task has been executed. If the task has ended when the processing result has the value "FailureRetry" (failed task that can be completed by retrying the same), then the task is to be executed again. In this case, the number of times of execution of the last-executed task is recorded. If the value of the Last Task Try Count field 710 has become a numerical value equal to or greater than a predetermined number of times, i.e., if the task has been repeatedly retried again but the processing of the task is not successfully completed, then the task is controlled as an error. A Max Task field 711 records the number of tasks included in the corresponding job. In the exemplary embodiment of the present invention, one to twenty tasks can be included in one job. The tasks are provided with serial task numbers, such as "task 1", "task 2", and "task 3".

Fields from a task 1 service ID 712 to a task 20 parameter 717 manage information about the task included in the job. The task 1 service ID 712 stores the ID of the service that provides the task to be executed first. The task 1 parameter 713 stores a parameter transferred to the task when the task 1 is executed. Similarly, the task 2 service ID 714 and the task 2 parameter 715 stores information about the task to be executed second. Further, the task 20 service ID 716 and the task 20 parameter 717 stores information about the task to be executed twentieth. The task information pieces about twenty tasks are stored in the above-described manner. In a first exemplary embodiment of the present invention, one job includes twenty tasks. However, in the exemplary embodiment of the present invention, the number of tasks that can be included in one job is not limited to a specific maximum number.

Now, a service table according to the exemplary embodiment of the present invention will be described in detail below with reference to FIG. 8. A service table 800 manages a service that provides the task. As described above, the job table 700 includes information about the service to be executed. More specifically, the information about the service to be executed is described in the job table 700 in order to allow the back-end processing unit 402 to write the status of the job and the task at timings before and after the task execution. On the other hand, to the service table 800, a definition of the service that a provider of the platform system 500 has previously received from a service provider is registered. In other words, the service table 800 does not manage the status information.

Here, the term "service provider" refers to a user who provides a service that utilizes the document extracting server 107, the document conversion server 108, and the print server 109. To paraphrase this, in the exemplary embodiment of the present invention, the "service provider" refers to the user who provides the tasks 1 through 3. The service table 800 is stored in the table storage service 506.

FIG. 8 illustrates an example of the service table 800. Referring to FIG. 8, an ETag 801 is similar to the ETag 701 illustrated in FIG. 7. A partition key 802 and a row key 803 indicate an ID for uniquely identifying each row of the table. In the service table 800, the partition key field 802 has a fixed value "service". The row key 803 is managed as an ID for identifying the task service. The task service will be described in detail below.

A uniform resource identifier (URI) 804 stores a uniform resource locator identifier (URI) of the web service that provides the service. The user can utilize the service by accessing the location having the URI managed in the URI 804. For example, it can be known from the service table 800 illustrated in FIG. 8 that the task whose row key 803 has a value "service01" utilizes the function provided by the document extracting server 107 based on the URI 804.

A type 805 stores the service type. The service type includes "In" (input service), "Pipe" (pipe service), and "Out" (output service). The input service is a service for executing processing for acquiring data from the document server 103. More specifically, the input service is a service for inputting data from an external system. The input service is implemented by executing the task 1. The pipe service is a service for executing processing for converting document data into print data. More specifically, the pipe service is a service for processing data. The pipe service is implemented by executing the task 2. The output service is a service for executing processing for inputting data to the print server 109. More specifically, the output service is a service for outputting data to the external system. The output service is implemented by executing the task 3. In the exemplary embodiment of the present invention, the function for implementing various services having the type "In", "Pipe", or "Out" is referred to as the "task service". As described above, each task service is identified by the row key 803.

An attribute field 806 stores attribute information about the task service. The attribute information is registered as information uniquely defined for each task service. For example, in the task service for acquiring data from the document server 103, information about the URI of the document server 103 is stored in the attribute field 806. In the task service for inputting a job to the print server 109, the attribute field 806 stores the information about the URI of the print server 109.

Now, a service sequence table according to the exemplary embodiment of the present invention will be described in detail below with reference to FIG. 9. A service sequence table 900 manages a service processing order. The job table 700 includes the service processing order for the following purpose. If the back-end processing unit 402 has executed the tasks in the processing order, the status of processing in each task and the task number of the task to be executed next can be written into the job table 700 at timings before and after the execution of the task, so that the status of progress of the processing in each task can be recognized.

On the other hand, the service sequence table 900 stores information about a combination of various services which are already registered to the service table 800. The service sequence table 900 will be described in detail below with reference to FIG. 9. As can be known from FIG. 9, a job that can be identified by a partition key 902 having a value "sequence" and a row key 903 having a value "seq01" includes three tasks, as indicated in a max task field 904. Further, the job includes service01, service02, and service03, as indicated in fields task 1 905, task 2 906, and task 3 907 in FIG. 9. For each task service defined by the task 1 field 905, the task 2 field 906, and the task 3 field 907, the type of each task service can be identified by referring to the service table 800.

The service sequence table 900 is stored in the table storage service 506.

FIG. 9 illustrates an example of the service sequence table 900. Referring to FIG. 9, the ETag 901 is similar to the ETag 701 illustrated in FIG. 7. The partition key 902 and the row key 903 indicate an ID for uniquely identifying each row of the table. In the service sequence table 900, the partition key field 902 has a fixed value "sequence". The row key 903 is managed as a sequence ID. The sequence ID is different from the job ID as follows. For the sequence ID, a common sequence ID is assigned to all the processing requests that have requested the same service. On the other hand, the job ID is a unique job ID that is assigned to each processing request if the same service is requested. The job ID functions as an identifier for identifying a processing request.

The max task field 904 stores a definition of the number of tasks included in the sequence. In the exemplary embodiment of the present invention, one to twenty tasks can be included in one sequence.

The fields task 1 905 through task 2 909 manage information about the sequence included in the task. The task 1 905 stores an ID of the service (the task service) that provides a task to be firstly executed. Thereafter, similarly, the task 2 906 stores information about the task to be executed second. The service sequence table 900 stores information about twenty tasks up to the task to be executed twentieth, whose information is stored in the task 20 909. As described above, in the exemplary embodiment of the present invention, the maximum number of the tasks is twenty. However, a value other than twenty can be set as the maximum number of tasks.

Now, an interface implemented in the task service registered to the service table 800, i.e., the document extracting service 410, the document conversion service 411, and the spool service 412, according to the exemplary embodiment of the present invention will be described in detail below with reference to FIGS. 18A through 18C.

The task service can be classified into three types, i.e., "IN", "PIPE", and "OUT". A predetermined interface is implemented to each of the three types.

Figure 18A:
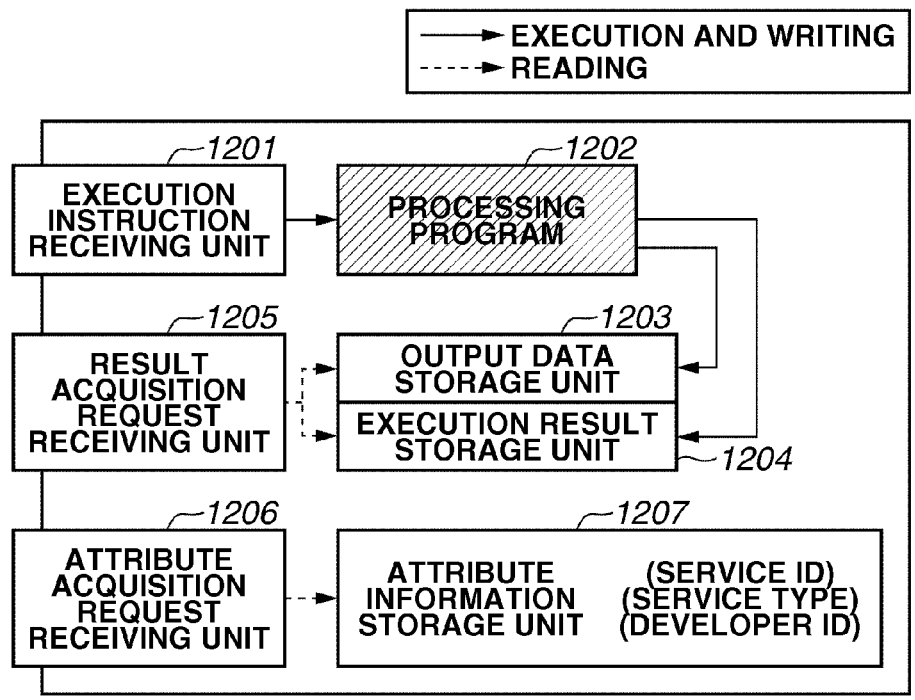
FIGS. 18A through 18C illustrate an example of a task according to an exemplary embodiment of the present invention.

It is necessary that the IN type task service includes an interface illustrated in FIG. 18A. In the exemplary embodiment of the present invention, the document extracting service 410 implements the interface.

Referring to FIG. 18A, an execution instruction receiving unit 1201 receives an instruction to execute the task and a parameter from the back-end processing unit 402. The parameter received by the execution instruction receiving unit 1201 is the task 1 parameter 713. After receiving the task execution instruction, the execution instruction receiving unit 1201 executes a processing program 1202. After executing the processing program 1202, the execution instruction receiving unit 1201 transmits a task end notification to the back-end processing unit 402 as a reply.

The processing program 1202 is a processing program designed to execute specific processing. If the task service is the IN type task service, the processing program 1202 executes processing for generating data within the web service or for acquiring data from an external server, such as the document server 103. The processing program 1202 stores the generated or acquired data in the output data storage unit 1203. In addition, the processing program 1202 stores a task execution result (the status of results, such as "Success" or "Failure") in the execution result storage unit 1204. The output data storage unit 1203 is an area that stores data output as a result of executing the task. The execution result storage unit 1204 is an area that stores the task execution result (the status of results, such as "Success" or "Failure").

A result acquisition request receiving unit 1205 receives a result acquisition request from the back-end processing unit 402. In addition, the result acquisition request receiving unit 1205 reads the information stored in the output data storage unit 1203 and the execution result storage unit 1204, and returns the data to the back-end processing unit 402.

An attribute acquisition request receiving unit 1206 acquires appropriate information from an attribute information storage unit 1207 according to an attribute acquisition request from the back-end processing unit 402. In addition, the attribute acquisition request receiving unit 1206 returns the attribute of the service. The attribute information storage unit 1207 stores information, such as the service ID, the service type, and a developer ID. The service ID is the same as the service ID assigned at the time of registering the service to the service table 800. In other words, the service ID is information for uniquely identifying the service. The service type is information about the type (the IN type, the PIPE type, or the OUT type) of the task service as described above. The developer ID enables identification of the developer of the function of the task service. In other words, the developer ID corresponds to a user who has developed the task services.

Figure 18B:
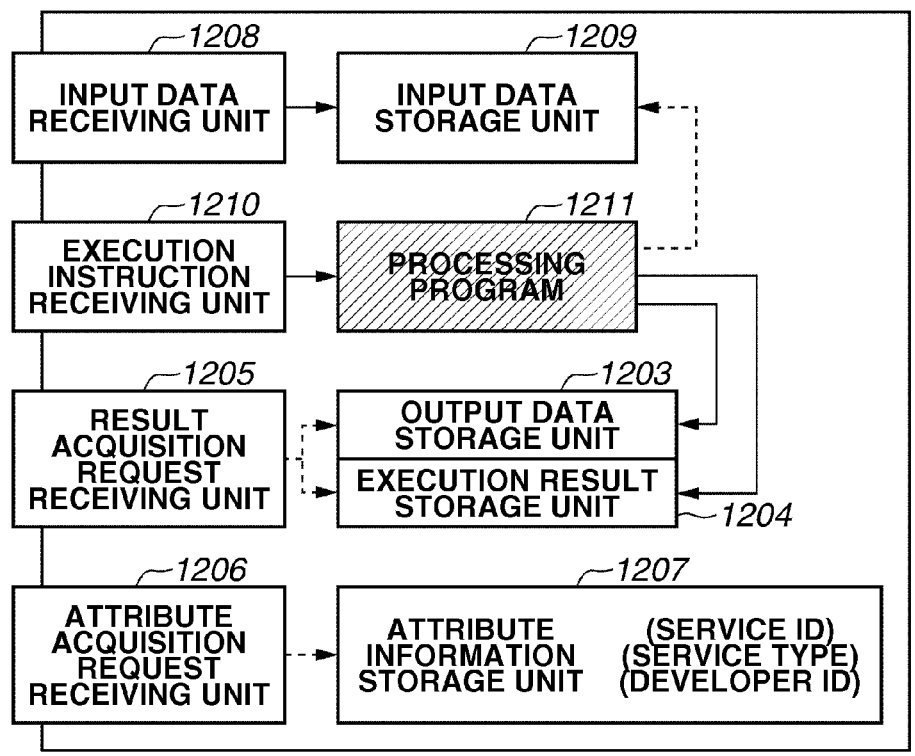

It is necessary that the PIPE type task service includes an interface illustrated in FIG. 18B. In the exemplary embodiment of the present invention, the document conversion service 411 implements the interface.

An input data receiving unit 1208 stores data transmitted according to an input data storage request from the back-end processing unit 402 in an input data storage unit 1209. The input data storage unit 1209 is an area that stores the data input to the task service. An execution instruction receiving unit 1210 receives an instruction to execute the task and a parameter from the back-end processing unit 402. After receiving the task execution instruction, the execution instruction receiving unit 1210 executes a processing program 1211. After executing the processing program 1211, the execution instruction receiving unit 1210 transmits a task end notification to the back-end processing unit 402 as a reply.

The processing program 1211 is a processing program designed to execute specific processing. If the task service is the PIPE type task service, the processing program 1211 acquires data from the input data storage unit 1209 and stores processed data in the output data storage unit 1203. In addition, the processing program 1211 stores a task execution result (the status of results, such as "Success" or "Failure") in the execution result storage unit 1204. A result acquisition request receiving unit 1214 has a function similar to that of the result acquisition request receiving unit 1205. More specifically, the result acquisition request receiving unit 1214 receives a result acquisition request from the back-end processing unit 402. In addition, the result acquisition request receiving unit 1214 reads the information stored in the output data storage unit 1203 and the execution result storage unit 1204, and returns the data to the back-end processing unit 402.

Figure 18C:
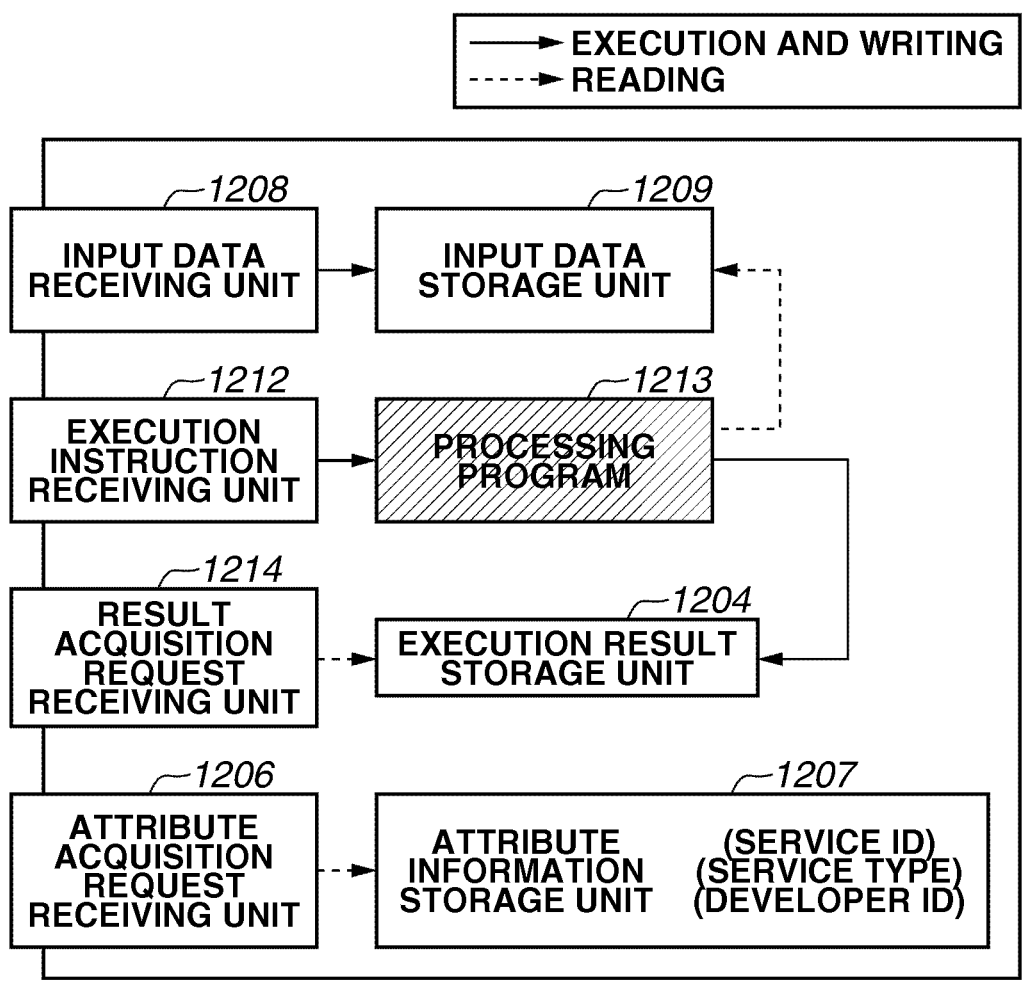

It is necessary that the OUT type task service includes an interface illustrated in FIG. 18C. In the exemplary embodiment of the present invention, the spool service 412 implements the interface. The input data receiving unit 1208 stores data transmitted according to an input data storage request from the back-end processing unit 402 in the input data storage unit 1209. The input data storage unit 1209 is an area that stores the data input to the task service.

An execution instruction receiving unit 1212 receives an instruction to execute the task and a parameter from the back-end processing unit 402. After receiving the task execution instruction, the execution instruction receiving unit 1212 executes a processing program 1213. After executing the processing program 1213, the execution instruction receiving unit 1212 transmits a task end notification to the back-end processing unit 402 as a reply.

The processing program 1213 is a processing program designed to execute specific processing. If the task service is the OUT type task service, the processing program 1213 acquires data from the input data storage unit 1209 and stores and manages processed data within the spool service 412. In addition, the processing program 1213 stores a task execution result (the status of results, such as "Success" or "Failure") in the execution result storage unit 1204.

The result acquisition request receiving unit 1214 receives a result acquisition request from the back-end processing unit 402. In addition, the result acquisition request receiving unit 1214 reads the information stored in the execution result storage unit 1204, and returns the data to the back-end processing unit 402.

Various functions of each task service described above are implemented by the CPU 301 by loading and executing a program stored in the indirect storage unit 303. All of the output data storage unit 1203, the execution result storage unit 1204, and the attribute information storage unit 1207 are implemented as areas secured on the direct storage unit 302 or the indirect storage unit 303. Similarly, the input data storage unit 1209 is also implemented as an area secured on the direct storage unit 302 or the indirect storage unit 303. The three types of interfaces of "IN", "PIPE", and "OUT" types have an open specification publicized by the developer of the platform system 500.

The person who has developed the service application that utilizes the three types of interfaces requests the developer of the platform system 500 to register the information about the service application to the service table 800 and the sequence table 900. Accordingly, the exemplary embodiment of the present invention can provide the service in which the image forming apparatus 104 and the service application cooperatively operate via the platform system 500 to the user of the image forming apparatus 104.

In other words, by generating a web service provided with "IN", "PIPE", and "OUT" type interfaces, the platform system 500 is made available and the web service can be provided to the image forming apparatus 104. As a result, a developer of the service application can cause the processing programs 1202, 1211, and 1213 to be executed in association with the image forming apparatus 104 and the platform system 500 without publicizing the inner configuration (the know-how and the characteristic technology) thereof.

Each type task service will be described in detail below. The IN type task service generates data within the service or acquires data from an external server such as the document server 103. In other words, the IN type task service is a service that does not require input information from the platform system 500. The PIPE type task service is a service provided based on a premise that input data that has been explicitly designated by the platform system 500 is processed and a result of the processing is output to the platform system 500. The OUT type task service is a service provided based on a premise that input data is explicitly received from the platform system 500 and that the result of processing of the input data is to be completed within the service or to be transmitted to the external server (i.e., that the result of the processing of the data is not to be output to the platform system 500).

The three types ("IN", "PIPE", and "OUT") of service interfaces are regulated as described above, and thus the following effects can be achieved. More specifically, an application provider can easily design a sequence starting from the IN type task service and then continues to the PIPE type task service and ends with the OUT type task service and easily call the sequence from the application. Further, by classifying the task service into three types, the processing program can be more easily diverted.

Figure 10B:
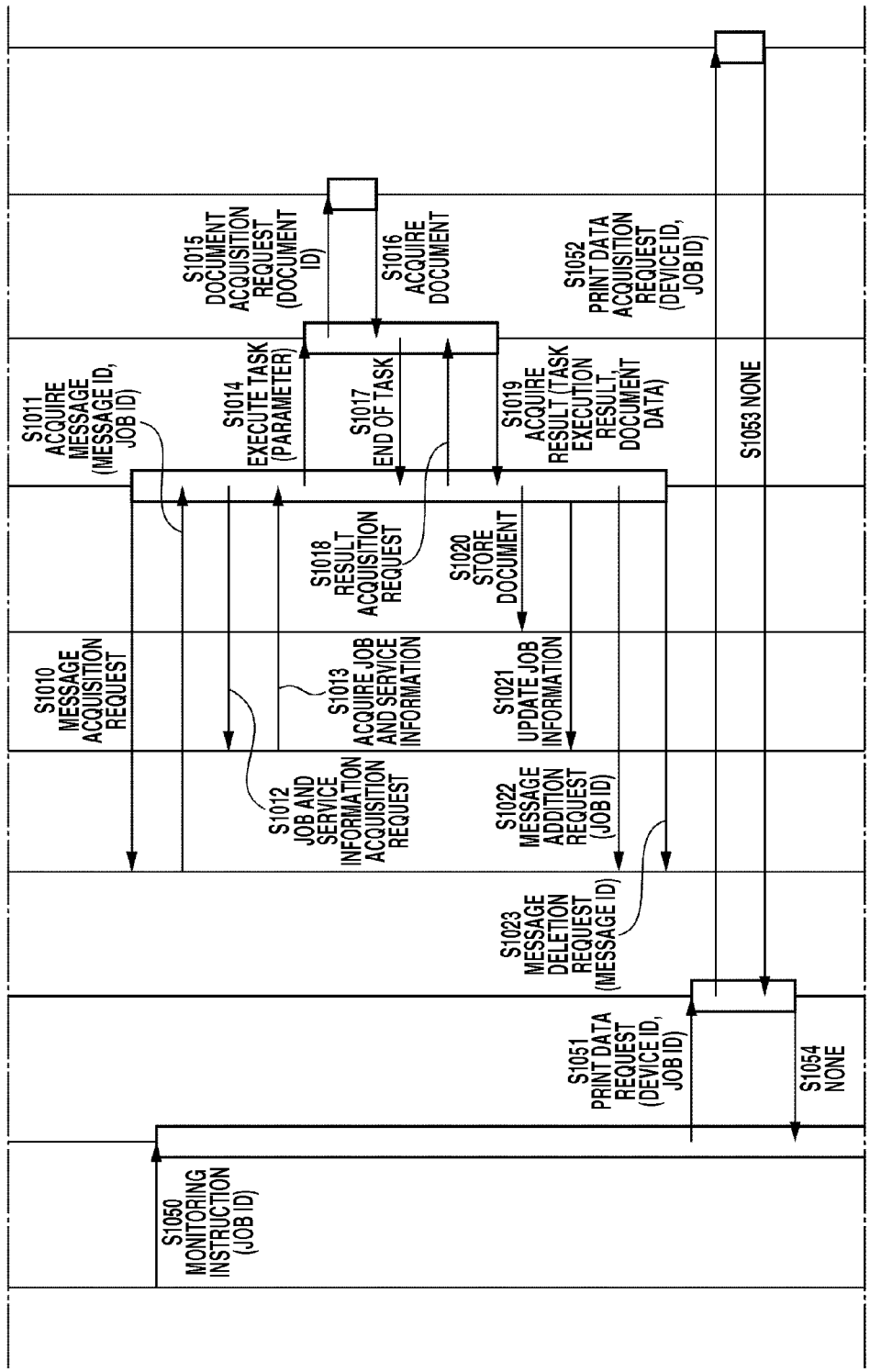
Figure 10C:
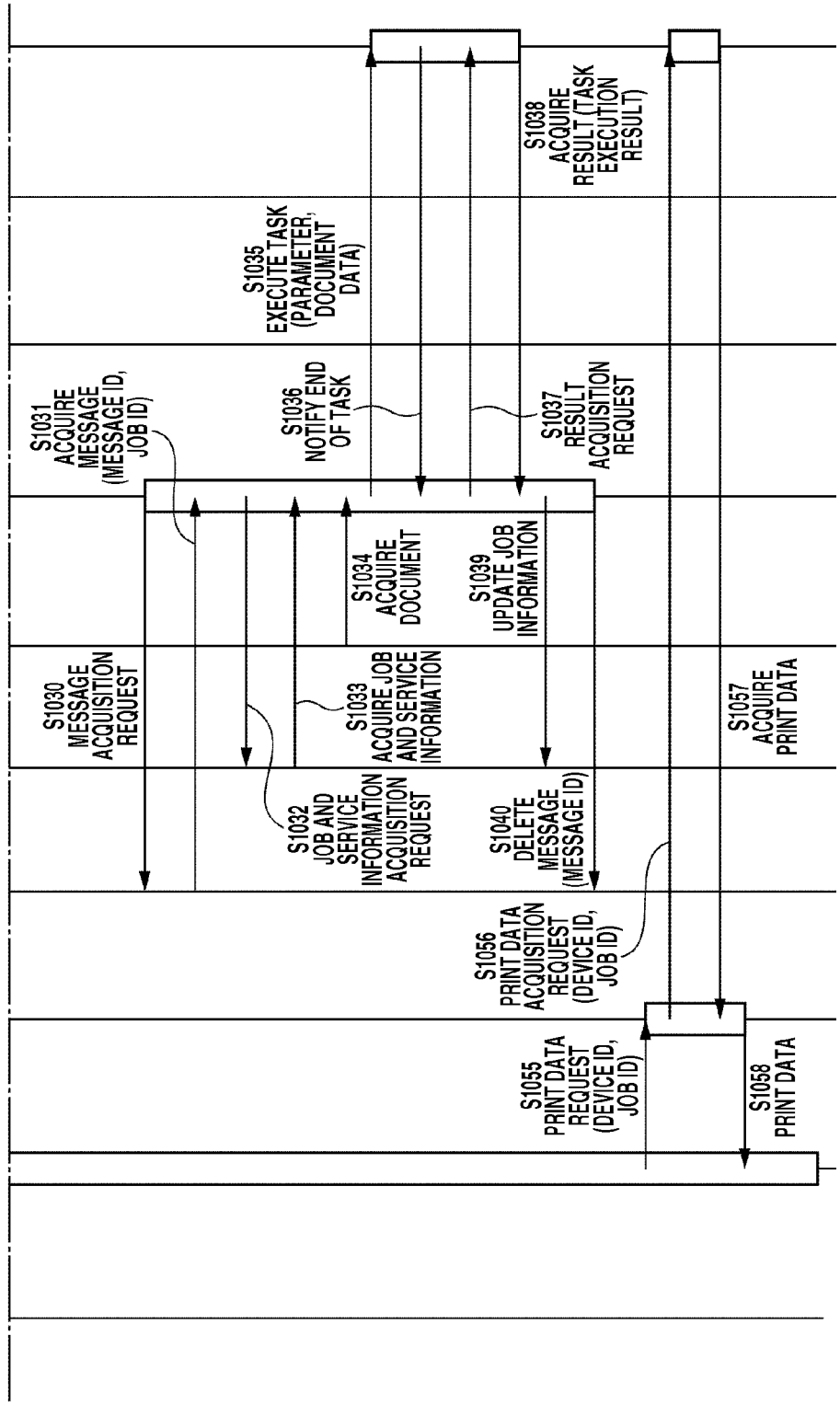

FIGS. 10A to 10C are a sequence diagram illustrating an exemplary flow of processing executed within the system according to the exemplary embodiment of the present invention.

A series of processing starts when a user starts an operation via the device browser 409 of the image forming apparatus 104. The device browser 409 communicates with the print application that operates on the request processing unit 401 to execute printing.

Figure 11:
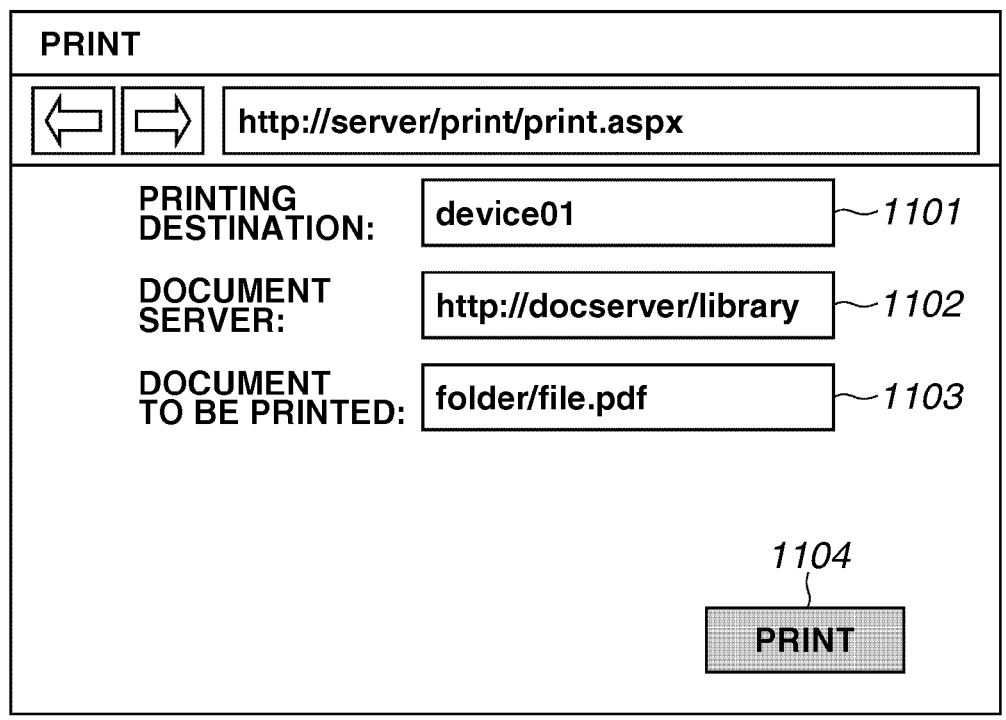
FIG. 11 illustrates an example of a print data selection screen displayed by a print application according to an exemplary embodiment of the present invention.

With reference to FIG. 11, a printing destination field 1101 displays a device ID that uniquely identifies the image forming apparatus 104 currently operated by the user. A document server field 1102 displays a uniform resource locator (URL) of the document server that acquires data. In the first exemplary embodiment of the present invention, the data registered to the attribute field 806 in the service table 800 is displayed in the document server field 1102.

A document to be printed field 1103 displays an ID of the document to be actually printed. The ID of the document is input by the user. In the example illustrated in FIG. 11, a document "folder/file.doc" will be printed. The document is stored in the document repository 406. The user can input an instruction to execute a previously defined print sequence by pressing a print button 1104. More specifically, the sequence ID defined by the row key field 903 in the service sequence table 900 illustrated in FIG. 9 is assigned to the print button 1104. When the user presses the print button 1104, the sequence ID is transmitted.

For example, if an ID "seq01" has been assigned as the sequence ID, the task corresponding to the ID seq01 is executed. When the print button 1104 illustrated in FIG. 11 is pressed by the user, in step S1001, the device browser 409 inputs a print instruction request to the request receiving unit 401. When the print instruction request is input, the document ID input via the document to be printed field 1103, the device ID displayed in the printing destination field 1101, and the sequence ID assigned to the print button 1104 are transferred as parameters.

After receiving the request, in step S1002, the request processing unit 401 inputs a sequence acquisition request to the service sequence table of the table storage service 403. The sequence acquisition request includes the sequence ID as a parameter. In step S1003, the table storage service 403 transmits requested sequence data of the sequence ID to the request processing unit 401 in response to the input request.

In step S1004, the request processing unit 401 inputs a job addition request to the job table of the table storage service 403. When the job addition request is input, the sequence ID and parameter data such as the document ID are transferred as parameters. In step S1005, the table storage service 403 executes job generation and addition processing and transmits the ID of the generated job to the request processing unit 401.

In step S1006, the request receiving unit 401 transmits a message addition request to the queue storage service 405. When the message addition request is input, the job ID acquired in step S1005 is transmitted as a parameter. The queue storage service 405 executes message addition processing.

In step S1007, in response to the request input in step S1001, the request receiving unit 401 acquires the job ID via the device browser 409. To paraphrase this, insteps S1001 through S1007, the device browser 409 requests the table storage service 403 to issue the job ID to via the request receiving unit 401. The device browser 409 receives the issued job ID via the request receiving unit 401.

By executing the above-described processing, the print instruction operation by the user is completed. Next, processing executed by the platform application 408 for acquiring print data will be described.

When the device browser 409 acquired the job ID in step S1007, the processing advances to step S1050. In step S1050, the device browser 409 inputs a monitoring instruction to the platform application 408. By inputting the monitoring instruction, the job ID is transferred as a parameter. In step S1051, the platform application 408 inputs a print data transmission request to the request receiving unit 401. By inputting the print data transmission request, the job ID and the device ID are transferred as parameters. Thereafter, the device browser 409 does not process the job although only temporarily. On the other hand, the platform application 408 periodically monitors the spool service 412 via the request receiving unit 401.

In step S1052, the request processing unit 401 transmits a print data acquisition request to the spool service 412. By transmitting the print data acquisition request, the job ID and the device ID are transferred as parameters. The spool service 412 checks whether data of the designated ID is present or not. If it is determined that the data of the designated ID is not present, then the processing advances to step S1053. In step S1053, the spool service 412 transmits a reply indicating that the print data is not present. After receiving the reply from the spool service 412, in step S1054, the request receiving unit 401 transmits a reply to the platform application 408 indicating that the print data is not present.

The platform application 408 repeats the processing for requesting transmission of print data until the print data is acquired. In step S1055, the platform application 408 repeats the request for transmitting print data. In steps S1056, S1055, S1051, and S1052, the similar processing for requesting the print data is executed.

The spool service 412 checks the presence or absence of the data of the designated ID. If it is determined that the print data is present, then the processing advances to step S1057. In step S1057, the spool service 412 transmits the print data as a reply. After receiving the reply from the spool service 412, the request receiving unit 401 transmits the print data as a reply to the platform application 408. The platform application 408 causes the image forming apparatus 104 to actually print the acquired print data.

The above-described flow is a flow for the front-end, which includes processing from the request of printing by the user to the output of the print result on the image forming apparatus 104.

Now, back-end processing will be described in detail below. More specifically, a flow of processing executed within the network printing system 1000 from processing for acquiring document data to be printed from the document server 103 to processing for adding print data to the print server 109 will be described in detail below. In step S1010, the back-end processing unit 402 periodically inputs a message acquisition request to the queue storage service 405. After acquiring a message from the queue in step S1011, the back-end processing unit 402 detects tags of the <MessageText> 603 and extracts a job ID inserted between the tags.

In step S1012, the back-end processing unit 402 inputs a job and service information acquisition request to the table storage service 403. In step S1013, the back-end processing unit 402 receives a reply of the job and service information. In the processing in step S1013, at first, the back-end processing unit 402 acquires information about the job corresponding to the job ID from the job management table. Then, the back-end processing unit 402 acquires, from the job information, the ID of the service that provides the task to be executed next. In addition, the back-end processing unit 402 acquires the job and service information corresponding to the service ID from the service table.

In step S1014, the back-end processing unit 402 executes the task described in the examples illustrated in FIGS. 18A through 18C based on the acquired job and service information. When executing the task, the back-end processing unit 402 transfers the parameter managed by the job table to the task as arguments. In the exemplary sequence illustrated in FIGS. 10A to 10C, the task executed in step S1014 is provided by the document extracting service 410.

In step S1015, the document extracting service 410 executed in step S1014 inputs a document acquisition request to the document repository 406. In the document acquisition request, the document extracting service 410 transfers the document ID as a parameter. The URL of the document repository 406 and the document ID can be acquired from the parameter transferred in step S1014. After the document repository 406 has received the document acquisition request in step S1015, the processing advances to step S1016. In step S1016, the document repository 406 transmits document data of the designated document ID to the document extracting service 410 as a response to the document acquisition request.

After receiving the document data in response to the document acquisition request, in step S1017, the document extracting service 410 transmits a task end notification to the back-end processing unit 402. In step S1018, the back-end processing unit 402 inputs a result acquisition request to the document extracting service 410. After receiving the request, in step S1019, the document extracting service 410 transmits a result in response thereto. As a reply to the result acquisition request, the result of executing the task and the document data are returned for the task.

After receiving the reply, in step S1020 (document storage processing), the back-end processing unit 402 stores the document data in the blob storage service 404. Further, in step S1021 (job information updating processing), the back-end processing unit 402 stores the task execution result in the job management table of the table storage service 403.

By executing the above-described processing, the processing of the task for acquiring the document data from the document server 103 ends. After the series of processing of the task has ended, the back-end processing unit 402 adds and deletes a message to and from the queue to execute a next task.

More specifically, at first, in step S1022 (message addition request processing), the back-end processing unit 402 adds a message corresponding to the job ID of the currently executed job to the queue storage service 405. By executing the processing in step S1022, the request for processing the task to be processed has been completely input. In step S1023 (message deletion request processing), the back-end processing unit 402 deletes the currently processed message from the queue storage service 405. Accordingly, the message that instructs the execution of the processed task is deleted from the queue. After that, processing for re-executing the same processing, which may have been suspended due to time-out, would not be executed.

Next, the sequence for executing the task will be described in detail below. The following is an exemplary flow for processing the task up to addition of print data to the print server 109. Processing in steps S1030 through S1033 is similar to that in steps S1010 through S1013.

In step S1034, the back-end processing unit 402 acquires the document data from the blob storage service 404 based on the acquired job and service information. In the example illustrated in FIGS. 10A to 10C, the back-end processing unit 402 acquires the document stored in step S1020. In step S1035, the back-end processing unit 402 executes the task. In executing the task, the parameter managed in the job table and the document data acquired in step S1034 are transferred as arguments. In the sequence illustrated in FIGS. 10A to 10C, the task executed in step S1035 is provided by the spool service 412.

The spool service 412 executed in step S1035 adds the print data based on the input parameter and the document data. In the exemplary embodiment of the present invention, the spool service 412 receives the device ID of the printing destination and the job ID as parameters, and manages the print data in association with the device ID and job ID. After adding the print data, in step S1036, the spool service 412 transmits a task end notification as a reply.

In step S1037, the back-end processing unit 402 transmits a result acquisition request to the spool service 412. After receiving the request, in step S1038, the spool service 412 transmits a result in response to the request. As a reply to the request, the spool service 412 transmits a result of executing the task. After receiving the response, in step S1039 (job information updating processing), the back-end processing unit 402 stores the task execution result into the job management table of the table storage service 403. In this manner, the processing of the task for adding the print data to the spool service 412 ends.

In the exemplary embodiment of the present invention, because the job ends when the print data is added, the back-end processing unit 402 deletes the message from the queue when the series of task processing ends. In step S1040 (message deletion request processing), the back-end processing unit 402 deletes the currently processed message from the queue storage service 405. Accordingly, the message corresponding to the currently processed task is deleted from the queue. Then the job ends. The network printing system 1000 of the present invention executes the entire processing in the above-described manner.

Now, control of the job to be executed by the back-end processing unit 402 will be described in detail below. By executing the following processing, the processing can be executed while maintaining the consistency of the job.

It is necessary that the IN type task service includes the interface illustrated in FIG. 18A. Accordingly, in the first exemplary embodiment of the present invention, the document extracting service 410 implements the interface.

The configuration of the interface and the task to be executed are described above with reference to FIGS. 18A through 18C. The network printing system 1000 according to the first exemplary embodiment of the present invention has the above-described configuration.

Figure 12:
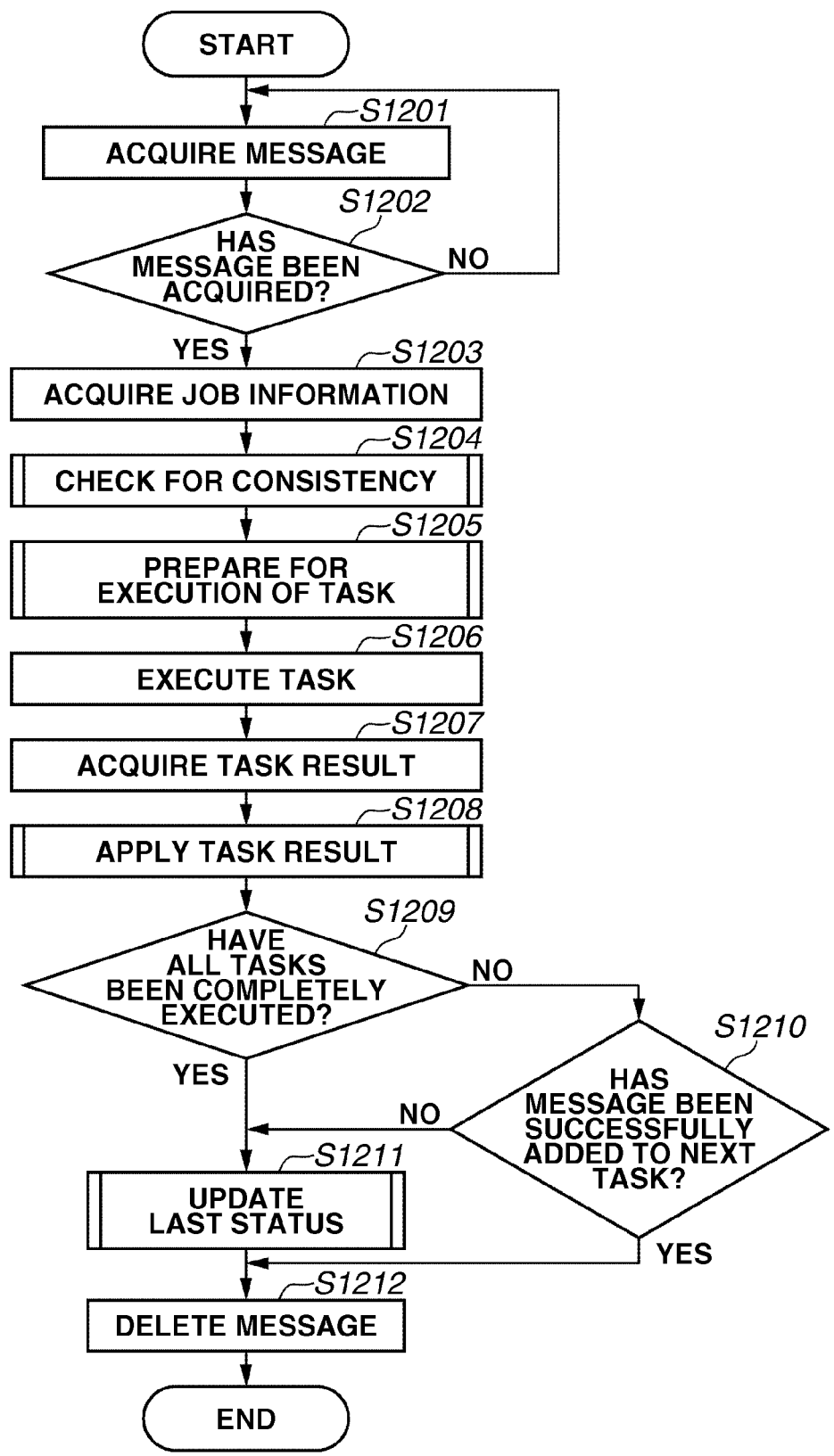
FIG. 12 is a flow chart illustrating an example of a series of job control processing executed by a back-end processing unit according to an exemplary embodiment of the present invention.

FIG. 12 is a flow chart illustrating an exemplary flow of a series of control of the job executed by the back-end processing unit 402. In the following description, processing in step S1206 is executed by the task. Processing in steps other than step S1206 illustrated in FIG. 12 is executed by the back-end processing unit 402 unless otherwise particularly described. Processing illustrated in FIGS. 13 through 17 is executed by the back-end processing unit 402 unless otherwise described.

To paraphrase this, the table storage service 403 which stores and manages the job and service information cannot be directly accessed from the task which stores the entity to be subjected to printing or image processing. In principle, the job and service information managed by the table storage service 403 is operated via the back-end processing unit 402. Accordingly, even if the task has run away, the job and service information that stores the status of the back-end processing unit 402 can be appropriately protected and managed under control of the job management service platform 413. Accordingly, one aspect of the embodiments above may secure the robustness and the consistency required for the printing system while maintaining the sufficient level of partition tolerance and availability at the same time.

Referring to FIG. 12, in step S1201, the back-end processing unit 402 acquires a message. The processing in step S1201 is equivalent to the processing in steps S1010 and S1030 illustrated in FIGS. 10A to 10C. In other words, the back-end processing unit 402 automatically and periodically starts the processing.

In step S1202, the back-end processing unit 402 checks whether the message has been acquired. If it is determined that no message has been acquired yet (NO in step S1202), then the back-end processing unit 402 repeats the processing in step S1201. On the other hand, if it is determined that a message has been acquired (YES in step S1202), then the processing advances to step S1203. In step S1203, the back-end processing unit 402 acquires the job and service information from the table storage service 403. The processing in step S1203 is equivalent to that in steps S1012 and S1032 illustrated in FIGS. 10A to 10C.

In step S1204, the back-end processing unit 402 checks the consistency. In the consistency checking processing, the back-end processing unit 402 checks whether inconsistency has occurred to the acquired job and service information. If it is determined that inconsistency has occurred, the back-end processing unit 402 corrects the job and service information to have an appropriate level of consistency. The processing will be described in detail below.

In step S1205, the back-end processing unit 402 executes task execution preparation processing. In the task execution preparation processing, the back-end processing unit 402 executes processing for starting a new job and processing for preparing for executing the task. The processing will be described in detail below.

In step S1206, the back-end processing unit 402 executes the task as illustrated in FIGS. 18A through 18C. The processing in step S1206 is equivalent to the processing in steps S1014 through S1017 and S1034 through S1036 illustrated in FIGS. 10A to 10C. In step S1207, the back-end processing unit 402 acquires a result of executing the task from the task. The processing in step S1207 is equivalent to that in steps S1018 and S1019 and steps S1037 and S1038 illustrated in FIGS. 10A to 10C.

In step S1208, the back-end processing unit 402 applies the task execution result to the table storage service 403. The processing in step S1208 is equivalent to the processing in steps S1021 and S1039 illustrated in FIGS. 10A to 10C. In the task result application processing, the back-end processing unit 402 updates the job information according to the task completion result. The processing will be described in detail below.

In step S1209, the back-end processing unit 402 checks whether all the tasks included in the job have been executed. If it is determined that any unexecuted task remains (NO in step S1209), then the processing advances to step S1210. In step S1210, the back-end processing unit 402 adds a message for the next task to the queue storage service 405. The processing in step S1210 is equivalent to the processing in step S1022 illustrated in FIGS. 10A to 10C.

On the other hand, if it is determined that all the tasks have been executed (YES in step S1209) or if it is determined that not all the tasks have been executed yet (NO in step S1209) and if the addition of the message for the next task has failed (NO in step S1210), then the processing advances to step S1211. In step S1211, the back-end processing unit 402 updates the last status for the table storage service 403. The processing in step S1211 is equivalent to the processing in step S1039 illustrated in FIGS. 10A to 10C. In the last status updating processing, the back-end processing unit 402 updates the last status of the job. The processing will be described in detail below.

After executing the last status updating processing in step S1211, the processing advances to step S1212. Similarly, if the message for the next task has been successfully added (YES in step S1210), then the processing advances to step S1212. In step S1212, the back-end processing unit 402 deletes the message. The processing in step S1212 is equivalent to the processing in steps S1023 and S1040 illustrated in FIGS. 10A to 10C.

After completely executing the series of processing up to step S1212, the back-end processing unit 402 returns to step S1201 and restarts the processing. The back-end processing unit 402 executes the series of processing for controlling the job in the above-described manner. In the following description, the consistency checking processing in step S1204, the task execution preparation processing in step S1205, the task result application processing in step S1208, and the last status updating processing in step S1211 will be described in detail in this order.

Figure 13:
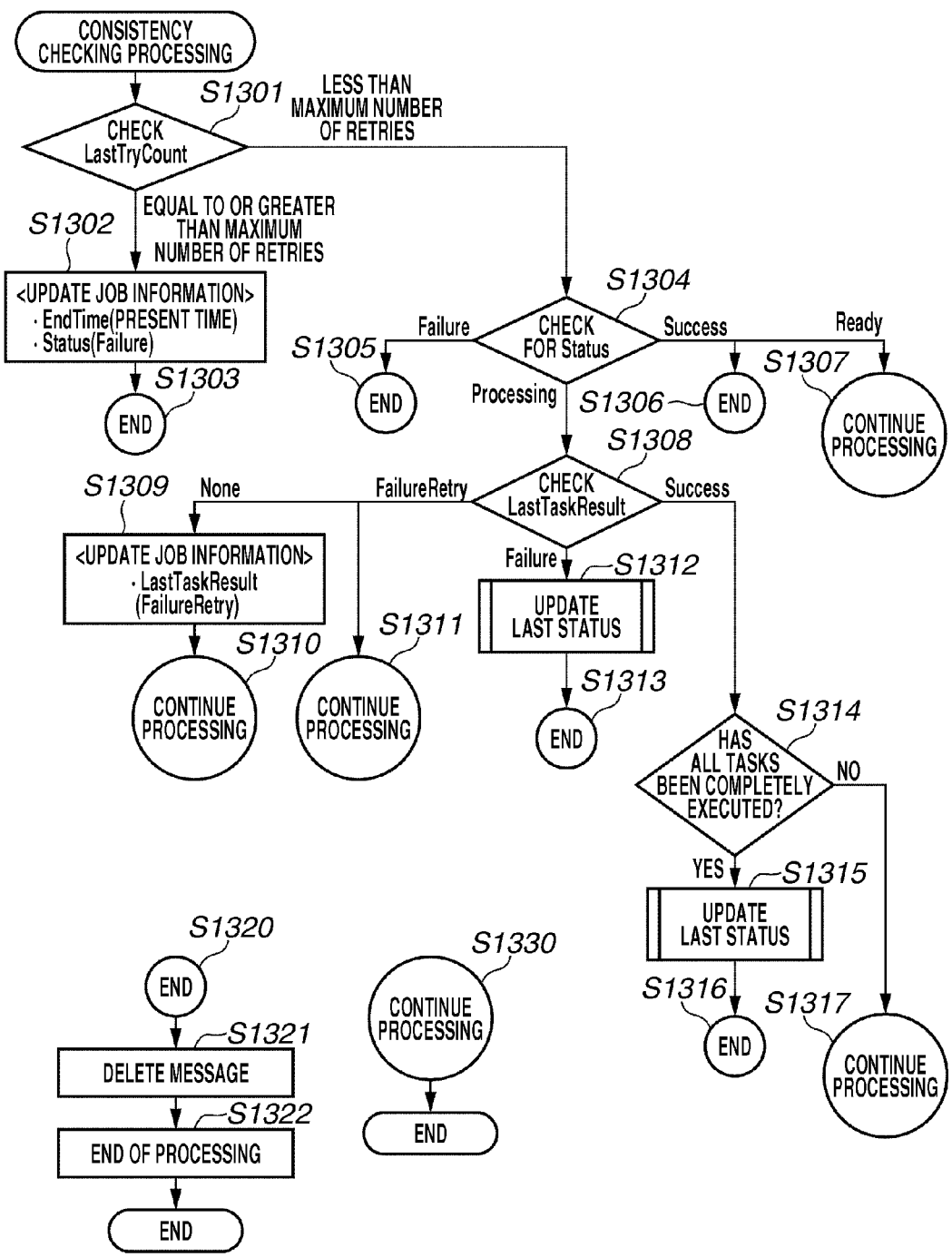
FIG. 13 is a flow chart illustrating an exemplary flow of consistency checking processing according to an exemplary embodiment of the present invention.

FIG. 13 is a flow chart illustrating details of the consistency checking processing in step S1204. Referring to FIG. 13, in step S1301, the back-end processing unit 402 checks a value of the Last Task Try Count 710 included in the job and service information. If the Last Task Try Count 710 has a value greater than a maximum number of retries which is previously determined within the system ("equal to or greater than maximum number of retries" in step S1301), then the processing advances to step S1302. The condition for advancing to step S1302 is that "an error has repeatedly occur in the same task of the same job again and again in the FailureRetry status".

In step S1302, the back-end processing unit 402 updates the End Time 705 of the job information with the present time and the Status 706 illustrated in FIG. 7 with the value "Failure". Then the processing advances to step S1303. For example, if the maximum number of retries has been determined to a value "3", then the back-end processing unit 402 assigns the value "Failure" to the processing of the job and ends the job if the same task has been terminated three times in the "FailureRetry" status.

On the other hand, if the value of the Last Task Try Count 710 is less than the maximum number of retries ("less than maximum number of retries" in step S1301), then the processing advances to step S1304. In step S1304, the back-end processing unit 402 checks the Status 706 included in the job information.

If the Status 706 has the value "Failure" ("Failure" in step S1304), then the processing advances to step S1305. The processing advances to step S1305 if either one of the following conditions is satisfied. The conditions include a case that the task has been terminated in the status "Failure" in the previous processing of the task, the last status updating processing in step S1211 has been normally completed, and the queue message has been terminated due to time-out during the last status updating processing, and a case that the deletion of the queue message in step S1212 has failed during the previous processing of the task. In this case, the processing of the job will be terminated by the processing illustrated in FIG. 13 to prevent re-execution of the same job.

On the other hand, if the Status 706 has the value "Success" ("Success" in step S1304), then the processing advances to step S1306 to end the processing. The processing advances to step S1306 if either one of the following conditions is satisfied. The conditions include a case that the task has been terminated in the status "Success" in the previous processing of the task, the last status updating processing in step S1211 has been normally completed, and the queue message has been terminated due to time-out during the last status updating processing, and a case that the deletion of the queue message in step S1212 has failed during the previous processing of the task. In this case, the processing of the job will be terminated by the processing illustrated in FIG. 13 to prevent re-execution of the same job.

On the other hand, if the Status 706 has the value "Ready" ("Ready" in step S1304), then the processing advances to step S1307 (operation continuation processing). The processing advances to step S1307 if a condition that the job is to be executed for the first time.

On the other hand, if the Status 706 has the value "Processing" ("Processing" in step S1304), then the processing advances to step S1308. The processing advances to step S1308 if either one of the following conditions is satisfied.

The conditions include a case that the task has been normally completed in the previous processing of the task, a case that the queue message has been terminated due to time-out during execution of the task in the previous processing of the task, a case that the task has been abnormally terminated and the previous processing of the task has been suspended halfway, and a case that the task has been normally completed in the previous processing of the task, and the task result application processing in step S1208 or the last status updating processing in step S1211 has failed.

In step S1308, the back-end processing unit 402 checks the Last Task Result 709 and determines which of the above-described condition is satisfied. Then, the back-end processing unit 402 corrects the job information according to each corresponding status.

If the Las Task Result 709 has the value "None" ("None" in step S1308), then the processing advances to step S1309. The processing advances to step S1309 if either one of the following conditions is satisfied. The conditions includes a case that the queue message has been terminated due to time-out during execution of the task in the previous processing of the task, a case that the task has been abnormally terminated and the previous processing of the task has been suspended halfway, and a case that the task has been normally completed in the previous processing of the task and the task result application processing in step S1208 has failed. In this case, in order to re-execute the task, the back-end processing unit 402 changes the value of the Last Task Result 709 to "FailureRetry". Then the processing advances to step S1310 (operation continuation processing).

On the other hand, if the Last Task Result 709 has the value "FailureRetry" ("FailureRetry" in step S1308), then the processing advances to step S1311. The processing advances to step S1311 if a condition that the previous task has been normally completed and that the task completion result has the value "FailureRetry" is satisfied. In this case, because it is necessary to re-execute the task, the processing advances to step S1311 to continue the processing.

On the other hand, if the Last Task Result 709 has the value "Failure" ("Failure" in step S1308), then the processing advances to step S1312. The processing advances to step S1312 if the condition that the previous task has been normally completed, the task completion result has the value "Failure", and the last status updating processing in step S1211 has failed is satisfied.

In this case, the back-end processing unit 402 executes the last status updating processing in step S1211 again. Then, the processing advances to step S1313 and the processing ends.

On the other hand, if the Last Task Result 709 has the value "Success" ("Success" in step S1308), then the processing advances to step S1314. The processing advances to step S1314 if either one of the following conditions is satisfied. The conditions include a case that the previous task has been normally completed and the task completion result is "Success", and a case that the previous task has been normally completed, the task completion result is "Success", the previous task is the last task of the job, and the last status updating processing in step S1211 has failed.

If the above-described condition is satisfied, the processing advances to step S1314. In step S1314, the back-end processing unit 402 further checks whether all tasks included in the job have been already executed.

If all the tasks have been completed (YES in step S1314), then the processing advances to step S1315. The processing advances to step S1315 if the condition that the previous task has been normally completed, the task completion result is "Success", the previous task is the last task of the job, and that the last status updating processing in step S1211 has failed is satisfied. In this case, the back-end processing unit 402 executes the last status updating processing in step S1211 again. In step S1316, the processing ends.

On the other hand, if not all the tasks included in the job have been completed yet (NO in step S1314), then the processing advances to step S1317 to continue the processing. The processing advances to step S1317 if the condition that the previous task has been normally completed and that the task completion result is "Success" is satisfied.

The operation ending processing in step S1320 and the continuous processing in step S1330 will be described in detail below. If the processing in each flow illustrated in FIG. 13 has advanced to the operation ending processing, the processing advances to step S1320 (operation ending processing). On the other hand, if the processing in each flow illustrated in FIG. 13 has advanced to the continuous processing, then the processing advances to step S1330.

In step S1321, the back-end processing unit 402 deletes the message. If the message is appropriately deleted, the processing of the job ends. In step S1322, the back-end processing unit 402 ends the processing without executing the processing in step S1205 and beyond. After the processing ends, the back-end processing unit 402 starts the processing from step S1201 as in the case where the processing has been normally completed.

If the processing has advanced to step S1330, the back-end processing unit 402 ends the consistency checking processing in step S1204 and advances to the task execution preparation processing in step S1205.

Figure 14:
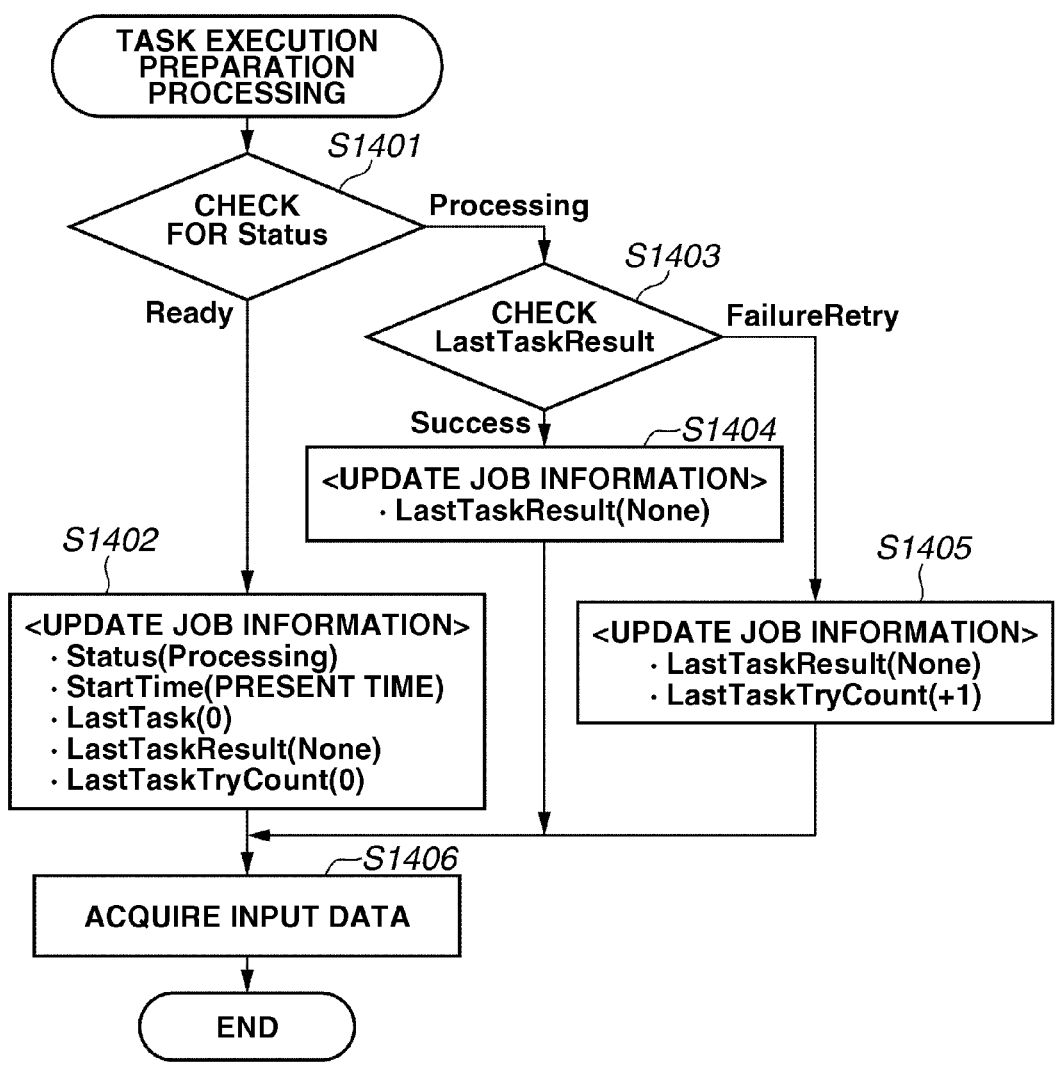
FIG. 14 is a flow chart illustrating an exemplary flow of task execution preparation processing according to an exemplary embodiment of the present invention.

FIG. 14 is a flow chart illustrating details of the task execution preparation processing in step S1205. Referring to FIG. 14, in step S1401, the back-end processing unit 402 checks the Status 706 of the job and service information illustrated in FIG. 7. If it is determined that the Status 706 has the value "Ready" ("Ready" in step S1401), then the processing advances to step S1402.

The processing advances to step S1402 if the processing has progressed up to step S1307. In step S1402, the back-end processing unit 402 updates the job information to start the job. More specifically, the back-end processing unit 402 updates the Status 706 to "Processing", the Start Time 704 to the present time managed by the system, the Last Task 708 to "0", the Last Task Result 709 to "None", and the Last Task Try Count 710 to "0". In the example illustrated in FIG. 14, after the above-described updating is completed, the processing of the job starts and the first task becomes ready for being executed for the first time.

If the Status 706 has the value "Processing" ("Processing" in step S1401), then the processing advances to step S1403.

The processing advances to step S1403 if the processing has progressed to either step S1310, S1311, or S1317. In step S1403, the back-end processing unit 402 checks the Last Task Result 709. By checking the Last Task Result 709, the back-end processing unit 402 determines which of the values "Success" and "FailureRetry" the completion result of the previous task has. Because the consistency checking processing in step S1204 has been executed, the task completion result does not have a value other than "Success" or "FailureRetry".

If the Last Task Result 709 has the value "Success" ("Success" in step S1403), then the processing advances to step S1404. The processing advances to step S1404 if the processing has progressed up to step S1317. In step S1404, the back-end processing unit 402 sets the value "None" to the Last Task Result 709 to execute the next task. By updating the Last Task Result 709 with the value "None", it is indicated that the next execution task is currently being processed.

If the Last Task Result 709 has the value "FailureRetry" ("FailureRetry" in step S1403), then the processing advances to step S1405. The processing advances to step S1405 if the processing has progressed up to step S1310 or S1311. In step S1405, the back-end processing unit 402 sets the value "None" to the Last Task Result 709 to retry the task and increments the Last Task Try Count 710 by one. After the Last Task Result 709 is updated with the value "None" and the Last Task Try Count 710 is incremented by 1 as described above, it is indicated that the next execution task is currently being processed and that the task is currently re-executed.

After the processing in either step S1402, S1404, and S1405 is completed, then the processing advances to step S1406. In step S1406, the back-end processing unit 402 acquires the input data. In addition, the back-end processing unit 402 transfers the acquired input data to the task. The input data acquisition processing is executed if the Type 805 in FIG. 8 of the service that provides the task to be executed has the value "Pipe" or "Out" and is not executed in the other cases.

Further, by utilizing the ID of the data recorded in the Data ID 707 of the job, the back-end processing unit 402 acquires the data necessary for executing the task from the blob storage service 507. The acquired data is transferred by the back-end processing unit 402 as a parameter in executing the task. The processing in step S1406 is equivalent to the processing in steps S1034 and S1035 illustrated in FIGS. 10A to 10C. By executing the above-described processing, the task execution preparation processing in step S1205 ends.

Figure 15:
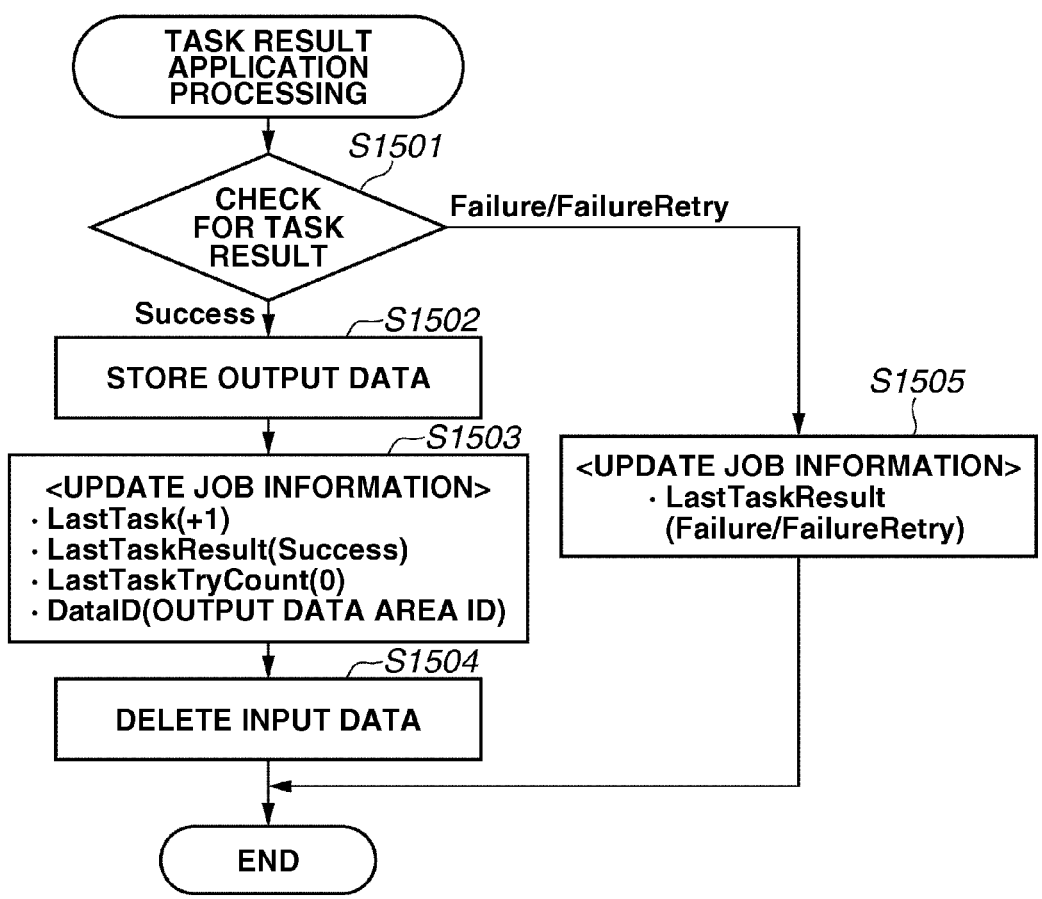
FIG. 15 is a flow chart illustrating an exemplary flow of task result application processing according to an exemplary embodiment of the present invention.

FIG. 15 is a flow chart illustrating details of the task result application processing in step S1208. Referring to FIG. 15, in step S1501, the back-end processing unit 402 checks the task result. The processing in step S1501 is processing for checking the result of executing the task which has been acquired by the task result application processing in steps S1019 and S1038.

If the task execution result is "Success" ("Success" in step S1501), the result indicates that the task has been successfully processed. Accordingly, in steps S1502 through S1504, the back-end processing unit 402 applies the successful processing result to the job and service information managed by the table storage service 403.

In step S1502, the back-end processing unit 402 stores the output data of the task. The output data refers to data acquired as a result of executing the task. The output data includes the document data acquired in step S1019, for example. The output data storage processing is executed if the type 805 of the service that provides the executed task is "In" or "Pipe". The back-end processing unit 402 stores the data in the blob storage service 507 and acquires a unique data ID. The acquired data ID is utilized in the next step.

In step S1503, the back-end processing unit 402 updates the job information. More specifically, in this case, because the task has been normally completed, the back-end processing unit 402 increments the Last Task 708 by 1. Further, the back-end processing unit 402 sets the task execution result value "Success" to the Last Task Result 709, the value "0" to the Last Task Try Count 710, and the ID of the data acquired in step S1502 to the Data ID 707.

In step S1504, the back-end processing unit 402 deletes the data identified by the data ID recorded in the data ID 707 before updating the job information in step S1503. The processing in step S1504 is executed for deleting the data that is a result of processing the task that has been executed in the past operations. More specifically, in step S1504, the data identified by the past data ID is deleted from the blob storage service 507.

If the task execution result has the value "Failure" or "FailureRetry" in step S1501, it is indicated that the task has failed. In this case, the processing advances to step S1505, and the back-end processing unit 402 applies a processing result corresponding to the failure. More specifically, in step S1505, the back-end processing unit 402 sets the task execution result value "Failure" or "FailureRetry" to the Last Task Result 709. By executing the above-described processing, the task result application processing in step S1208 ends.

Figure 16:
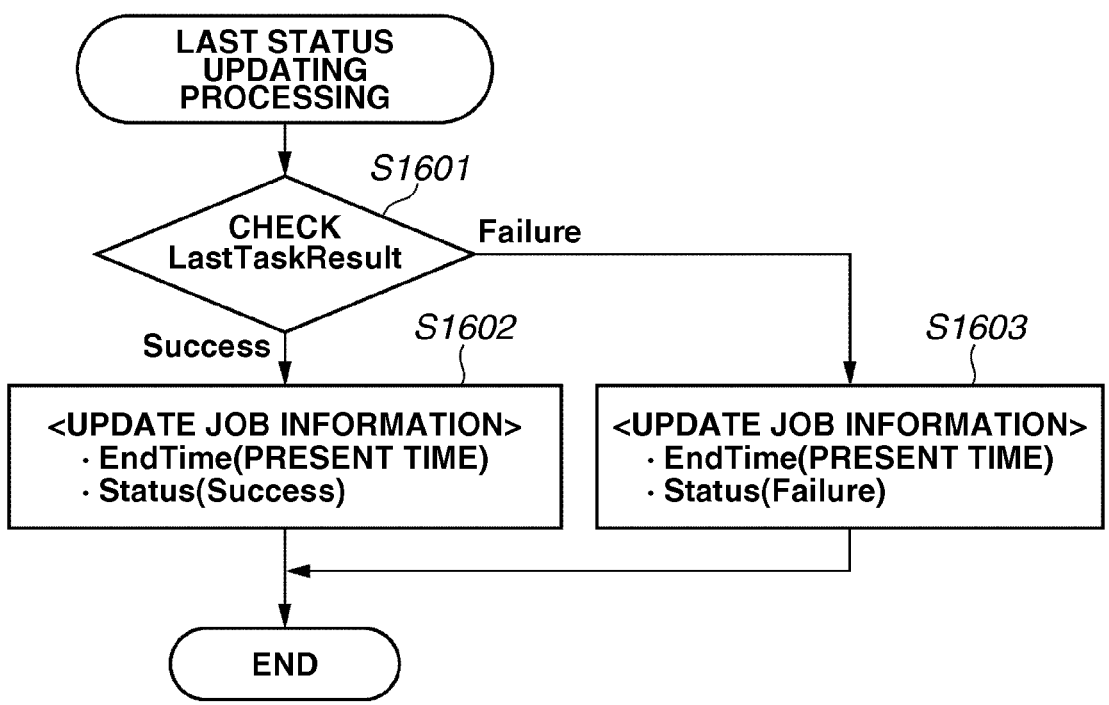
FIG. 16 is a flow chart illustrating an exemplary flow of last status updating processing according to an exemplary embodiment of the present invention.

FIG. 16 is a flow chart illustrating details of the last status updating processing in step S1211. The last status updating processing in step S1211 is executed if the last task has been completed or if the task has been terminated due to an error with the result "Failure".

Referring to FIG. 16, in step S1601, the back-end processing unit 402 checks the Last Task Result 709. If the Last Task Result 709 has the value "Success" ("Success" in step S1601), then in step S1602, the back-end processing unit 402 updates the status of the job with the value "Success". In addition, the back-end processing unit 402 sets the present time to the End Time 705 and the value "success" to the Status 706.

On the other hand, if the Last Task Result 709 has the value "Failure" ("Failure" in step S1601), then in step S1603, the back-end processing unit 402 updates the status of the job with the value "Failure". In addition, the back-end processing unit 402 sets the present time to the End Time 705 and the value "Failure" to the Status 706. After executing the above-described processing, the last status updating processing in step S1211 ends.

Figure 17:
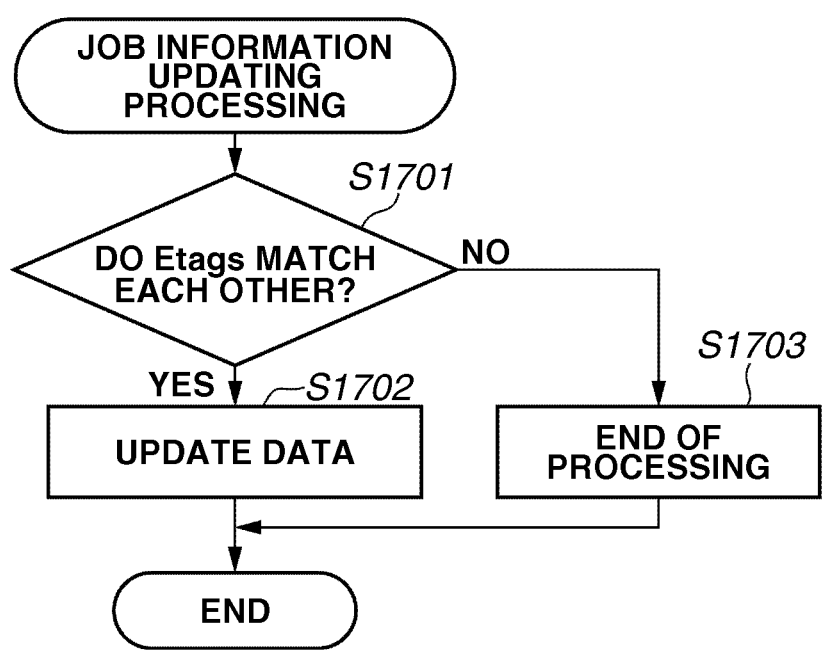
FIG. 17 is a flow chart illustrating an exemplary flow of job information updating processing according to an exemplary embodiment of the present invention.

FIG. 17 is a flow chart illustrating details of the job information updating processing. The processing illustrated in FIG. 17 is always executed in updating the job information during the processing in each flow chart of FIGS. 12 through 16.

Referring to FIG. 17, in step S1701, the back-end processing unit 402 checks whether the value of the ETag 701 recorded in the data to be updated in the table storage service 506 matches the value of the ETag 701 acquired by the job information acquisition processing in step S1203. If the values of the ETag 701 match each other (YES in step S1701), then in step S1702, the back-end processing unit 402 updates the data. On the other hand, if the values of the ETag 701 do not match each other (NO in step S1701), then in step S1703, the back-end processing unit 402 ends the processing without executing the processing that has caused the status for advancing to step S1703 and beyond.

After the processing ends, the back-end processing unit 402 restarts the processing from step S1201 as in the case of the normally completed processing. The processing in step S1703 may occur if either one of the following conditions is satisfied. The conditions include a case that the queue message has been terminated due to time-out and the job whose processing is continued even after the time-out and the job that is being retried are executed at the same time as each other, and a case that the deletion of the queue message has failed, a plurality of messages corresponding to one job has been registered on the queue, and the same job is executed at the same time.

The former condition may arise when the queue is timed out because it has taken time longer than expected to process the task for extracting a document. If the queue is timed out, the message becomes visible. Accordingly, the back-end processing unit 402 acquires the same job as the job corresponding to the currently executed task and executes the acquired job again. In this case, the same jobs may be executed at the same time.

The latter condition may arise if the processing in step S1212 has failed after successfully completing the processing in step S1210. If the processing in step S1212 fails, the message becomes visible due to time-out. Because the newly added message and the existing message include the same job ID, the same jobs may be executed at the same time. By executing the above-described processing, even if the same jobs are executed at the same time, a result of the job whose processing is completed earlier than the other job only is to be applied. By executing the above-described processing illustrated in FIG. 17, the present invention can maintain the consistency in updating the job information. Accordingly, by executing the processing described above with reference to FIGS. 12 through 17, the present invention can implement execution of the job with the consistency.

According to the exemplary embodiment of the present invention described above, processing can be implemented with a high consistency even in the environment of cloud computing, in which the consistency, the availability, and the partition tolerance have a mutual trade-off relationship. If print processing is executed again and again due to, for example, a case in which one print instruction has been executed in the network printing system but it has taken time longer than expected to process the printing task and the same printing tasks are executed at the same time or a case in which the completion of the printing task has not been securely applied and the same printing tasks are re-executed, the present invention can effectively prevent actual outputting, from the printer, of more print products or more pages thereof than desired, by applying only the result of the task whose processing has been surely completed.

Accordingly, the present invention can prevent the user from being charged for unintended print products or a confidential document from being left, which may occur when an unintended print product is printed but not received by the user.

The job management service platform 413 is described above in the present invention as an example of a service platform that manages the job related to image processing in a distributed environment according to a processing request received via the back-end processing unit 402 which is an example of a request receiving program. The server computers 102 is discussed above as an example of an image processing system including one or more computers that causes the back-end processing unit 402 to process jobs. Further, under control of the back-end processing unit 402, a plurality of processing requests related to image processing is received. Furthermore, the received processing requests are registered by the request receiving unit 401 to the queue storage service 405 as a job.

The back-end processing unit 402 periodically acquires the registered job at the timing set by the administrator of the system without waiting for a request from the user or the program. Under control of the back-end processing unit 402, the back-end processing unit 402 causes the task in FIG. 18 defined in the job acquired by the back-end processing unit 402 to be executed by the CPU (including a virtual CPU). In addition, the back-end processing unit 402 records the Status 706 which is a result of processing of the executed task and which is an example of information used to maintain the consistency of the image processing system in an area which is protected against writing by the task and managed by the job management service platform 413 (particularly the table storage service 403).

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2010-036554 filed Feb. 22, 2010, which is hereby incorporated by reference herein in its entirety.

What is claimed is:

1. A processing system comprising:
   a request receiving unit provided by a request receiving program;
   a back-end processing unit provided by a back-end processing program, wherein the back-end processing unit operates asynchronously with the request receiving unit;
   a queue storage unit configured to add a job transmitted from the request receiving unit that has received a processing request from an information processing apparatus to a queue, and to cause the back-end processing unit to acquire the job added to the queue in response to an acquisition instruction from the back-end processing unit;
   a plurality of service units configured to execute tasks under a control of the back-end processing unit that has received the job from the queue storage unit; and
   a table storage unit configured to manage information for identifying a task that has been completed for each job,
   wherein the back-end processing unit is provided in plurality, and each of the plurality of the back-end processing units periodically requests the queue storage unit for acquiring a job, and
   Wherein, when one of the plurality of the back-end processing units acquires a job from the queue storage unit, the back-end processing unit that has acquired the job causes a service unit that is to execute a next task to execute, under a control of the back-end processing unit, the next task based on the information being managed by the table storage unit for identifying a task that has been completed.

2. The processing system according to claim 1, wherein the table storage unit manages information for identifying a specific task in response to completion of execution of the specific task by a service unit.

3. The processing system according to claim 1, wherein the table storage unit records a number of errors that a specific task is unsuccessfully executed by a service unit and if the number of errors exceeds a predetermined value, the specific task is controlled as an error.

4. A processing method comprising:
   receiving a request via a request receiving program;
   operating a back-end processing unit asynchronously with the request receiving program, wherein the back-end processing unit is provided in plurality;
   adding a job transmitted from the receiving step that has received a processing request from an information processing apparatus to a queue, and causing the back-end processing unit to acquire the job added to the queue in response to an acquisition instruction from the back-end processing unit;

executing tasks by a plurality of service units under a control of the back-end processing unit that has received the job from the adding step; and managing information for identifying a task that has been completed for each job, wherein each of the plurality of the back-end processing units periodically requests the adding step to acquire a job, and wherein, when one of the plurality of the back-end processing units acquires a job from the adding step, the back-end processing unit that has acquired the job causes a service unit that is to execute a next task to execute, under a control of the back-end processing unit, the next task based on the information being managed by the managing step for identifying a task that has been completed.

5. The processing method according to claim 4, wherein the managing step manages information for identifying a specific task in response to completion of execution of the specific task by a service unit.

6. The processing system according to claim 4, wherein the managing step records a number of errors that a specific task is unsuccessfully executed by a service unit and if the number of errors exceeds a predetermined value, the specific task is controlled as an error.

7. A non-transitory computer-readable storage medium storing instructions which, when executed by an image processing system, cause the image processing system to perform operations of the method according to claim 4.

8. A system comprising:
- a request transmitting unit configured to transmit a processing request;
- a request receiving unit configured to receive the processing request from the request transmitting unit;
- a back-end processing unit configured to periodically request a queue storage unit for acquiring a job, wherein the back-end processing unit operates asynchronously with the request receiving unit, wherein the queue storage unit is configured to add a job transmitted from the request receiving unit to a queue, and to cause the back-end processing unit to acquire the job added to the queue in response to an acquisition instruction from the back-end processing unit;
- a plurality of service units configured to execute tasks under a control of the back-end processing unit that has received the job from the queue storage unit; and
- a table storage unit configured to manage information for identifying a task that has been completed for each job, wherein the back-end processing unit is provided in plurality, and wherein, when one of the plurality of the back-end processing units acquires a job from the queue storage unit, the back-end processing unit that has acquired the job causes a service unit that is to execute a next task to execute the next task based on the information being managed by the table storage unit for identifying a task that has been completed.

* * * * *